US012573380B2

(12) United States Patent
Tangari et al.

(10) Patent No.: US 12,573,380 B2
(45) Date of Patent: Mar. 10, 2026

(54) TRANSFORMING NATURAL LANGUAGE TO A LOGICAL FORM

(71) Applicant: Oracle International Corporation, Redwood Shores, CA (US)

(72) Inventors: Gioacchino Tangari, Sydney (AU); Cong Duy Vu Hoang, Melbourne (AU); Stephen Andrew McRitchie, Palo Alto, CA (US); Steve Wai-Chun Siu, Melbourne (AU); Dalu Guo, Sydney (AU); Christopher Mark Broadbent, Wellington, FL (US); Thanh Long Duong, Melbourne (AU); Srinivasa Phani Kumar Gadde, Fremont, CA (US); Vishal Vishnoi, Redwood City, CA (US); Kenneth Khiaw Hong Eng, Newark, CA (US); Chandan Basavaraju, Bangalore (IN)

(73) Assignee: Oracle International Corporation, Redwood Shores (CA)

( * ) Notice: Subject to any disclaimer, the term of this patent is extended or adjusted under 35 U.S.C. 154(b) by 151 days.

(21) Appl. No.: 18/656,274

(22) Filed: May 6, 2024

(65) Prior Publication Data

US 2025/0095635 A1    Mar. 20, 2025

Related U.S. Application Data

(60) Provisional application No. 63/582,931, filed on Sep. 15, 2023.

(51) Int. Cl.
G10L 15/06         (2013.01)

(52) U.S. Cl.
CPC .... G10L 15/063 (2013.01); *G10L 2015/0631* (2013.01)

(58) Field of Classification Search
CPC ........... G10L 15/063; G10L 2015/0631; G10L 15/1822; G06F 40/30
See application file for complete search history.

(56) References Cited

U.S. PATENT DOCUMENTS 6,985,901 B1 *   1/2006   Sachse ................ H04L 41/5032
                                                      709/224
11,113,269 B1 *   9/2021   Andrade Garcia ... G06F 16/211
(Continued)

OTHER PUBLICATIONS

"Actions and Parameters", Available Online at: https://cloud.google.com/dialogflow/es/docs/intents-actions-parameters, Accessed from Internet on Nov. 30, 2023, pp. 1-10.
(Continued)

*Primary Examiner* — Michael Colucci
(74) *Attorney, Agent, or Firm* — Kilpatrick Townsend & Stockton LLP

(57)          ABSTRACT

Techniques are disclosed herein for managing ambiguous date mentions in natural language utterances in transforming natural language utterances to logical forms by encoding the uncertainties of the ambiguous date mentions and including the encoded uncertainties in the logical forms. In a training phase, training examples including natural language utterances, logical forms, and database schema information are automatically augmented and used to train a machine learning model to convert natural language utterances to logical form. In an inference phase, input database schema information is augmented and used by the trained machine learning model to convert an input natural language utterance to logical form.

20 Claims, 15 Drawing Sheets

(56) References Cited

U.S. PATENT DOCUMENTS

| | | | |
|---|---|---|---|
| 11,604,790 | B2 | 3/2023 | Ranganathan et al. |
| 2009/0193039 | A1* | 7/2009 | Bradley .............. G06F 16/2465 |
| 2013/0231919 | A1 | 9/2013 | Xiong et al. |
| 2016/0255139 | A1* | 9/2016 | Rathod ................ H04L 51/046 |
| | | | 709/203 |
| 2017/0193392 | A1* | 7/2017 | Liu ........................ G06N 20/00 |
| 2018/0095962 | A1 | 4/2018 | Anderson et al. |
| 2018/0203833 | A1* | 7/2018 | Liang .................... G06F 3/0482 |
| 2018/0210883 | A1 | 7/2018 | Ang |
| 2020/0175336 | A1* | 6/2020 | Eberlein ............. G06F 11/3692 |
| 2020/0211131 | A1* | 7/2020 | Pangerl .............. G06Q 30/0645 |
| 2020/0303072 | A1* | 9/2020 | Drokin ................... G16H 10/60 |
| 2021/0117437 | A1* | 4/2021 | Gibson ................. G06F 16/258 |
| 2023/0325384 | A1 | 10/2023 | Nallapati et al. |
| 2024/0346021 | A1* | 10/2024 | Xuan ...................... G06F 40/20 |
| 2024/0403345 | A1* | 12/2024 | Feener ............... G06F 16/3329 |

OTHER PUBLICATIONS

Bogojeska, et al., "ezNL2SQL: A System for Network Devices Management with a Natural Language Interface for Databases", Available Online at: https://ieeexplore.ieee.org/document/9464006, Jun. 30, 2021, 8 pages.

Gao , et al., "Datatone: Managing Ambiguity in Natural Language Interfaces for Data Visualization", Proceedings of the 28th Annual Association for Computing Machinery Symposium on User Interface Software & Technology, Available Online at: https://doi.org/10.1145/2807442.2807478, Nov. 5, 2015, 12 pages.

He , et al., "DeBERTaV3: Improving DeBERTa Using ELECTRA-Style Pre-Training with Gradient-Disentangled Embedding Sharing", Available Online at: https://arxiv.org/pdf/2111.09543v1.pdf, Nov. 18, 2021, pp. 1-17.

Rubin , et al., "SmBoP: Semi-Autoregressive Bottom-Up Semantic Parsing", Available Online at: https://arxiv.org/pdf/2010.12412.pdf, Apr. 11, 2021, pp. 311-324.

Veltri , et al., "Data Ambiguity Profiling for the Generation of Training Examples", Available Online at: https://ieeexplore.ieee.org/document/10184547, Jul. 26, 2023, 14 pages.

Wang , et al., "RAT-SQL: Relation-Aware Schema Encoding and Linking for Text-to-SQL Parsers", Available Online at: https://arxiv.org/pdf/1911.04942.pdf, Aug. 24, 2021, 12 pages.

* cited by examiner

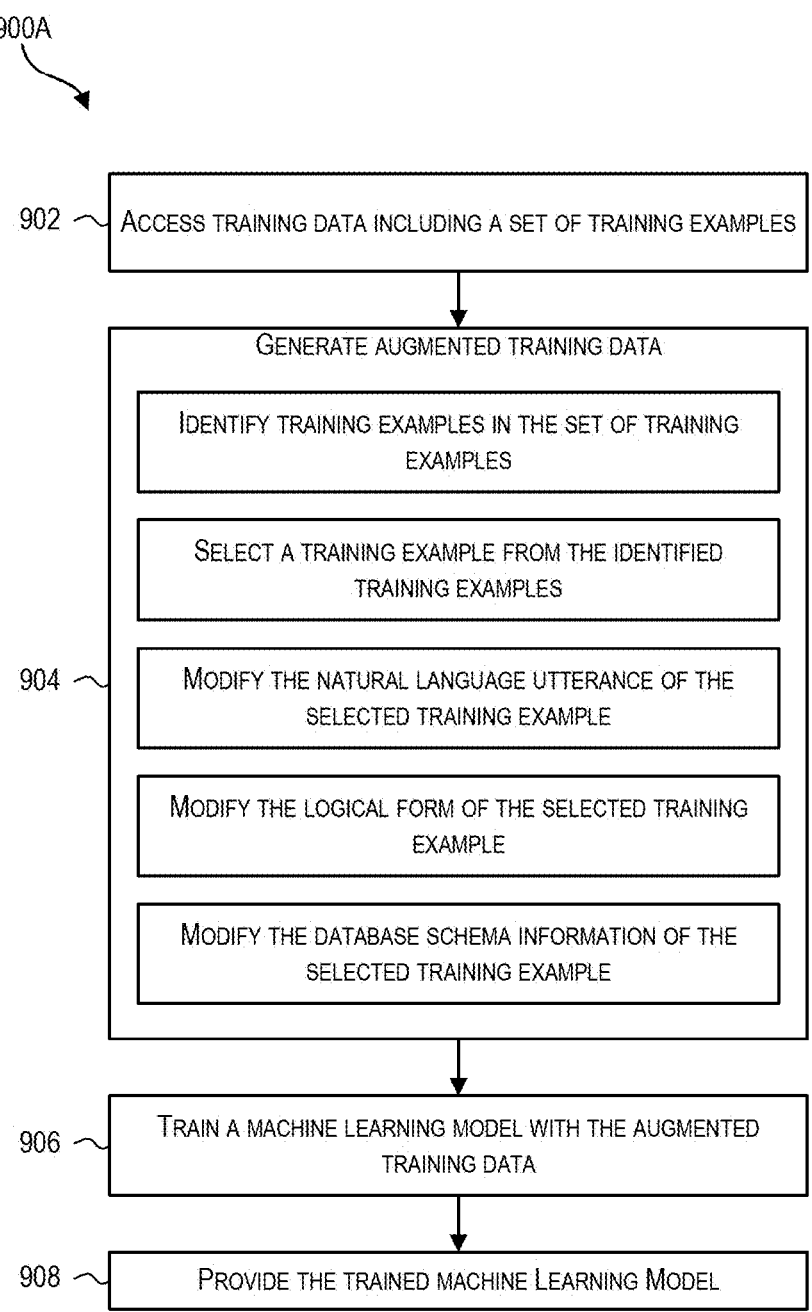

900A

902 — ACCESS TRAINING DATA INCLUDING A SET OF TRAINING EXAMPLES

GENERATE AUGMENTED TRAINING DATA

IDENTIFY TRAINING EXAMPLES IN THE SET OF TRAINING EXAMPLES

SELECT A TRAINING EXAMPLE FROM THE IDENTIFIED TRAINING EXAMPLES

904 — MODIFY THE NATURAL LANGUAGE UTTERANCE OF THE SELECTED TRAINING EXAMPLE

MODIFY THE LOGICAL FORM OF THE SELECTED TRAINING EXAMPLE

MODIFY THE DATABASE SCHEMA INFORMATION OF THE SELECTED TRAINING EXAMPLE

906 — TRAIN A MACHINE LEARNING MODEL WITH THE AUGMENTED TRAINING DATA

908 — PROVIDE THE TRAINED MACHINE LEARNING MODEL

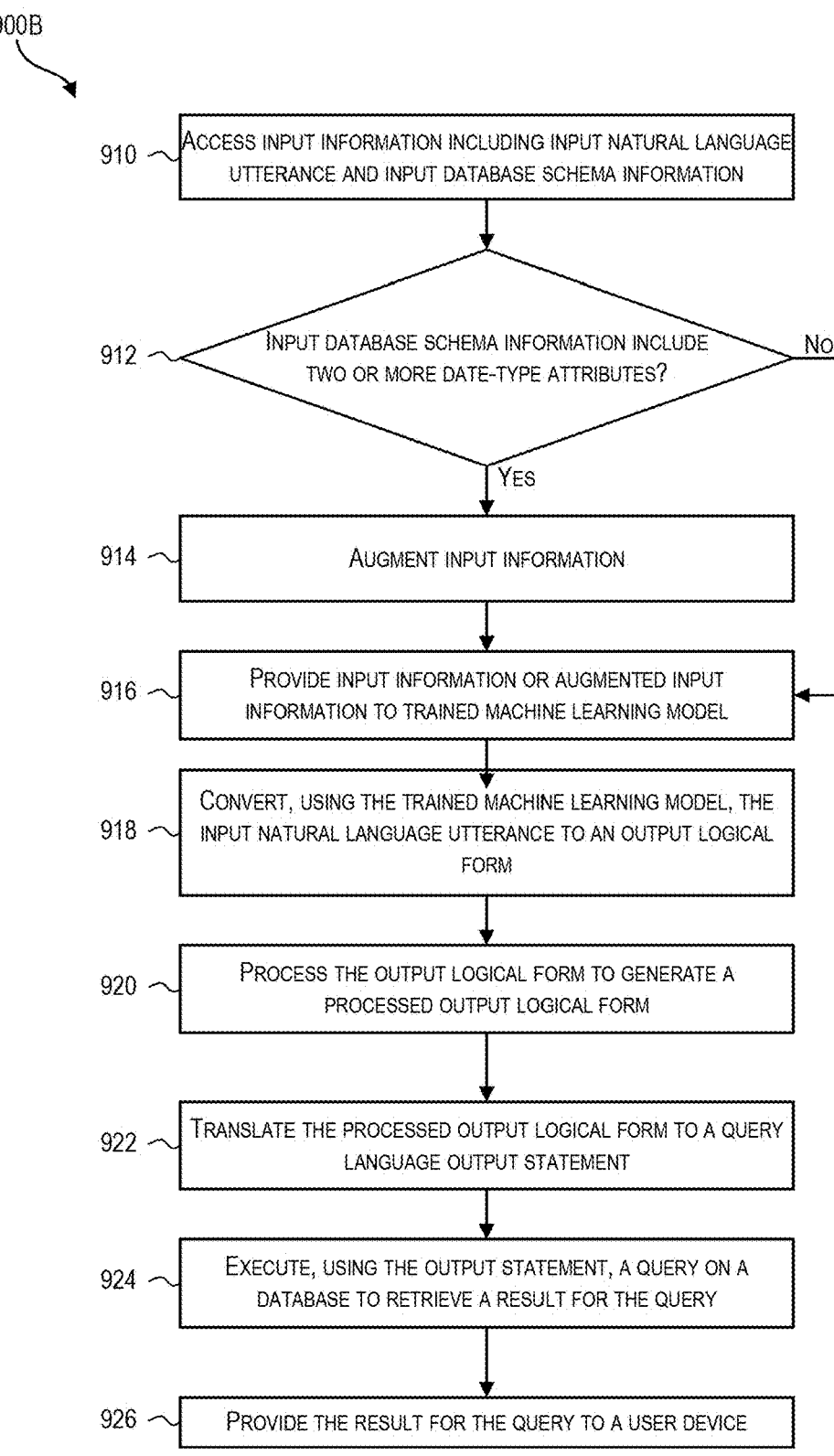

910 — ACCESS INPUT INFORMATION INCLUDING INPUT NATURAL LANGUAGE UTTERANCE AND INPUT DATABASE SCHEMA INFORMATION

912 — INPUT DATABASE SCHEMA INFORMATION INCLUDE TWO OR MORE DATE-TYPE ATTRIBUTES?

No

YES

914 — AUGMENT INPUT INFORMATION

916 — PROVIDE INPUT INFORMATION OR AUGMENTED INPUT INFORMATION TO TRAINED MACHINE LEARNING MODEL

918 — CONVERT, USING THE TRAINED MACHINE LEARNING MODEL, THE INPUT NATURAL LANGUAGE UTTERANCE TO AN OUTPUT LOGICAL FORM

920 — PROCESS THE OUTPUT LOGICAL FORM TO GENERATE A PROCESSED OUTPUT LOGICAL FORM

922 — TRANSLATE THE PROCESSED OUTPUT LOGICAL FORM TO A QUERY LANGUAGE OUTPUT STATEMENT

924 — EXECUTE, USING THE OUTPUT STATEMENT, A QUERY ON A DATABASE TO RETRIEVE A RESULT FOR THE QUERY

926 — PROVIDE THE RESULT FOR THE QUERY TO A USER DEVICE

*FIG. 9B*

TRANSFORMING NATURAL LANGUAGE TO A LOGICAL FORM

CROSS-REFERENCE TO RELATED APPLICATIONS

The present application is a non-provisional application and claims the benefit of and priority to U.S. Provisional Application No. 63/582,931 having a filing date of Sep. 15, 2023, the entire contents of which are incorporated herein by reference for all purposes.

FIELD

The present disclosure relates generally to transforming natural language to a logical form, and more particularly, to techniques for managing ambiguous date mentions in transforming natural language to a logical form.

BACKGROUND

Artificial intelligence has many applications. To illustrate, many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

Artificial intelligence-based solutions, such as chatbots, may have both analog (human) and digital (machine) interfaces for interacting with a human and connecting to a backend system. It is advantageous to be able to extract and analyze the meaning of an utterance (e.g., a request) when a human makes one using natural language, independent of how a backend system will handle the utterance. As an example, a request might be for data that needs to be retrieved from a relational database, or the requested data might need to be extracted from a knowledge graph. A meaning representation language (MRL) is a versatile representation of a natural language utterance that a chatbot can translate into any number of target machine-oriented languages. As such, an MRL can be utilized by a chatbot to communicate interchangeably with both a human and various backend systems, including systems that communicate using Structured Query Language (SQL), Application Programming Interfaces (APIs), REpresentational State Transfer (REST), Graph Query Language (GraphQL), Property Graph Query Language (PGQL), etc.

For example, SQL is a standard database management language for interacting with relational databases. SQL can be used for storing, manipulating, retrieving, and/or otherwise managing data held in a relational database management system (RDBMS) and/or for stream processing in a relational data stream management system (RDSMS). SQL includes statements or commands that are used to interact with relational databases. SQL statements or commands are classified into, among others, data query language (DQL) statements, data definition language (DDL) statements, data control language (DCL) statements, and data manipulation language (DML) statements. To interact with relational databases using SQL, users must know how the database is structured (e.g., knowledge of the tables and rows and columns within each table), SQL syntax, and how to relate the syntax to the database structure. Without this knowledge, users often have difficultly using SQL to interact with these relational databases.

Natural language interfaces to databases (NLIDB) provide users with a means to interact with these relational databases in an intuitive way without requiring knowledge of a particular database management language. For example, using NLIDB, users can interact with these relational databases using natural language statements and queries (i.e., using plain language). Recently, text-to-SQL systems have become popular and deep learning approaches to converting natural language queries to SQL queries have proved promising. Using semantic parsing, natural language statements, queries, requests, and questions (i.e., sentences) can be transformed into a machine-oriented language that can be executed by an application (e.g., chatbot, model, program, machine, etc.). For example, semantic parsing can transform natural language sentences into general purpose programming languages such as Python, Java, and SQL. Processes for transforming natural language sentences to SQL queries typically include rule-based, statistical-based, and/or deep learning-based systems. Rule-based systems typically use a series of fixed rules to translate the natural language sentences to SQL queries. These rule-based systems are generally domain-specific and, thus, are considered inelastic and do not generalize well to new use cases (e.g., across different domains). Statistical-based systems, such as slot-filling, label tokens (i.e., words or phrases) in an input natural language sentence according to their semantic role in the sentence and use the labels to fill slots in the SQL query. Generally, these statistical-based systems have limitations on the types of sentences that can be parsed (e.g., a sentence must be able to be represented as a parse tree). Deep-learning based systems, such as sequence-to-sequence models, involve training deep-learning models that directly translate the natural language sentences to machine-oriented languages and have been shown to generalize across tasks, domains, and datasets.

BRIEF SUMMARY

Techniques are disclosed herein for managing ambiguous date mentions in transforming natural language to a logical form.

In various embodiments, a method includes accessing training data including a set of training examples, wherein each training example of the set of training examples includes a natural language utterance, a logical form corresponding to the natural language utterance, and database schema information, wherein the database schema information includes a date-type attribute; generating augmented training data including a set of augmented training examples and the set of training examples, wherein each augmented training example of the set of augmented training examples corresponds to at least one training example of the set of training examples, and generating each augmented training example of the set of augmented training examples includes:

modifying a particular natural language utterance of a particular training example of the set of training examples, modifying a particular logical form of the particular training example, and modifying particular database schema information of the particular training example, wherein modifying the particular database schema information includes adding an additional date-type attribute to the particular database schema information; training a machine learning model with the augmented training data to generate a trained machine learning model; and providing the trained machine learning model.

In some embodiments, the method further includes selecting the particular training example based on identifying training examples in the set of training examples that include: a date mention in the natural language utterance of a respective training example; a date-type attribute in the logical form of the respective training example; and a plurality of date-type attributes in the database schema information of the respective training example.

In some embodiments, modifying the particular natural language utterance comprises converting a date mention in the particular natural language utterance into a modified version of the date mention, wherein the converting the date mention into the modified version of the date mention introduces an ambiguous date mention in the particular natural language utterance.

In some embodiments, the particular logical form comprises a first date-type attribute, and wherein modifying the particular logical form comprises replacing the first date-type attribute with a second date-type attribute that corresponds to the additional date-type attribute.

In some embodiments, the trained machine learning model is provided to a query execution system, and the method further includes: accessing input information collected by the query execution system, the input information comprising an input natural language utterance and input database schema information; augmenting the input information to generate augmented input information, the augmented input information comprising the input natural language utterance and a modified version of the input database schema information, wherein the modified version of the input database schema information comprises a new attribute; providing the augmented input information to the trained machine learning model; and converting, using the trained machine learning model, the input natural language utterance to an output logical form based on the input natural language utterance and the modified version of the input database schema information, wherein the output logical form for the input natural language utterance comprises an operator and the new attribute.

In some embodiments, augmenting the input information includes: determining that the input database schema information includes two or more date-type attributes; and generating the modified version of the input database schema information by adding a new attribute to the input database schema information, the new attribute corresponding to the additional date-type attribute.

In some embodiments, the input natural language utterance comprises an ambiguous date mention, and wherein converting the input natural language utterance to the output logical form comprises linking the ambiguous date mention to the new attribute.

In some embodiments, the method further includes processing the output logical form to generate a processed output logical form, wherein the processing output logical form to generating the processed output logical form comprises replacing an attribute included in the modified version of the input database schema information in the output logical form with another attribute included in the modified version of the input database schema information; translating the processed output logical form to a query language output statement; executing, using the query language output statement, a query on a database associated with the input database schema information to retrieve a result for the query; and providing, by the query execution system, the result for the query to a user device.

Some embodiments include a system including one or more processors and one or more computer-readable media storing instructions which, when executed by the one or more processors, cause the system to perform part or all of the operations and/or methods disclosed herein.

Some embodiments include one or more non-transitory computer-readable media storing instructions which, when executed by one or more processors, cause a system to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 9A is a process flow for training and providing a machine learning model for transforming a natural language utterance to a logical form in accordance with various embodiments.

FIG. 9B is a process flow for using a machine learning model trained to transform a natural language utterance to a logical form to execute a query in accordance with various embodiments.

DETAILED DESCRIPTION

Figure 1:
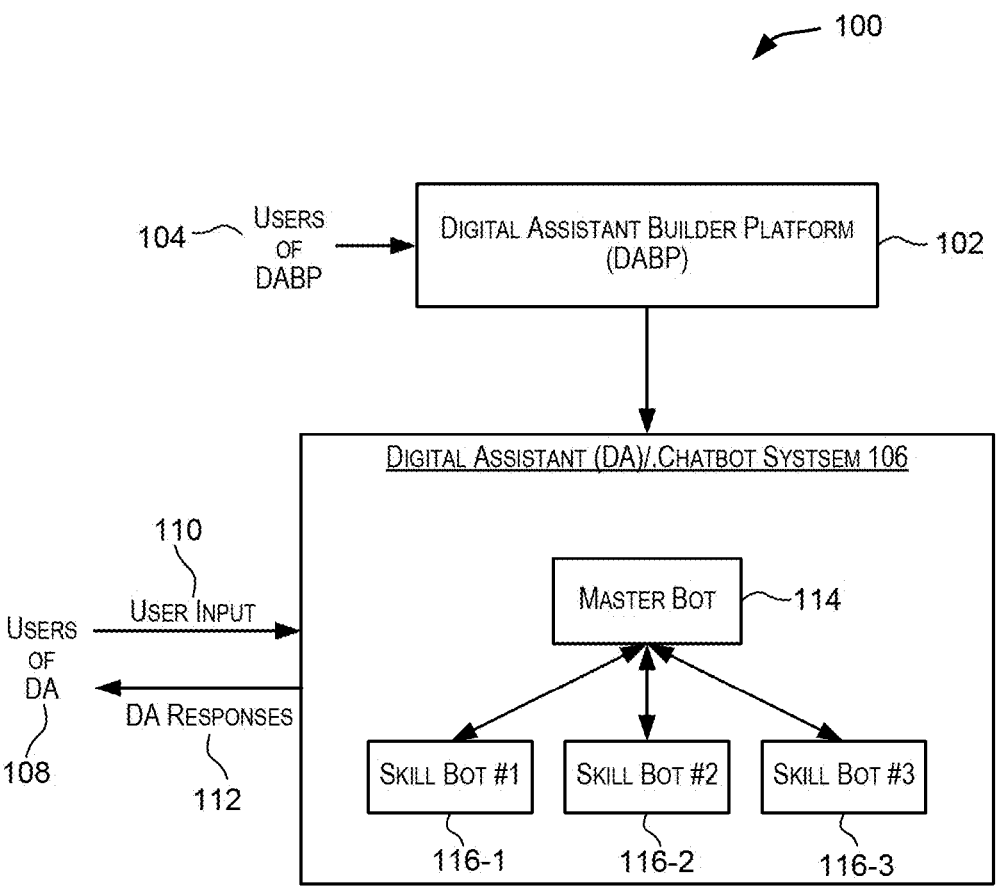
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.
Introduction In recent years, the amount of data powering different industries and their systems has been increasing exponentially. A majority of business information is stored in the form of relational databases that store, process, and retrieve data. Databases power information systems across multiple industries, for instance, consumer tech (e.g., orders, cancellations, refunds), supply chain (e.g., raw materials, stocks, vendors), healthcare (e.g., medical records), finance (e.g., financial business metrics), customer support, search engines, and much more. It is imperative for modern data-driven companies to track the real-time state of its business in order to quickly understand and diagnose any emerging issues, trends, or anomalies in the data and take immediate corrective actions. This work is usually performed manually by analysts who compose complex queries in query languages (e.g., declarative database query languages) like Structured Query Language (SQL) and property graph query language (PGQL). Composing such queries can be used to derive insightful information from data stored in multiple tables. These results are typically processed in the form of charts or graphs to enable users to quickly visualize the results and facilitate data-driven decision making.

Although common database queries (e.g., SQL queries) are often predefined and incorporated in commercial products, any new or follow-up queries still need to be manually coded by the analysts. Such static interactions between database queries and consumption of the corresponding results require time-consuming manual intervention and result in slow feedback cycles. It is vastly more efficient to have non-technical users (e.g., business leaders, doctors, or other users of the data) directly interact with the analytics tables via natural language (NL) queries that abstract away the underlying query language (e.g., SQL) code. Defining the database query requires a strong understanding of database schema and query language syntax and can quickly get overwhelming for beginners and non-technical stakeholders. Efforts to bridge this communication gap have led to the development of a new type of processing called NL interfaces to databases systems (NLIDB), which facilitates search capabilities in databases using NL. Such NL search capabilities have become more popular over recent years, and, as such, companies are developing deep-learning approaches for other NLIDB-type capabilities such as natural language to logical form (NL2LF), NL to SQL (NL2SQL), and the like. In the present context, a logical form of a NL statement or utterance is a precisely specified semantic version of that statement or utterance in a formal system. Examples of logical forms include meaning representation language (MRL) and/or a machine-oriented language such as SQL or PGQL.

The logical form (LF) derived from a NL can be machine-understandable and used to run queries against databases. For example, in the case of SQL, NL2SQL can allow end users to run unstructured queries (e.g., in the form of NL) against databases and/or can enable digital assistants such as chatbots and others to improve their responses when the answer can be found in different databases or tables. In the case of NL to MRL (NL2MRL), an end user's NL utterance can be transformed into an intermediate database query language (e.g., Oracle's Meaning Representation Query Language (OMRQL)—referred to herein as Oracle Meaning Representation Language (OMRL)). The intermediate representation can then be translated to one or more desired query formats, such as SQL or PGQL using a translation process. Thereafter, the utterance in the desired query format may be executed on a system such as database to obtain data relevant to the query and formulate a response to the NL utterance (e.g., an answer to the user's question) for review by a user.

Transforming NL to a LF generally involves using one or more trained models (e.g., NL2LF models) to semantically parse input NL utterances to extract information from the input NL utterances. Input NL utterances often involve and/or revolve around dates. Take, for example, the NL utterances "show total profit by ship date" and "show profit by order date in 2022". To retrieve relevant information from a target database, the information extracted from the NL utterance needs to be linked to attributes of the database. For this task, the NL2LF model is generally provided with information describing the target database (e.g., database schema information) and trained to predict which attributes of the target database are relevant to the query. For example, for the utterance "show total profit by ship month" and a database that includes customer identification, purchase information, ship date, and order date attributes as parts of its schema, the NL2LF model can predict that the entity "ship month" refers to the ship date date-type attribute of the database. Similarly, for the utterance "show profit orders in 2022" and the same database, the NL2LF model can predict that the entity "2022" refers to the order date date-type attribute of the database.

Linking a date mention or date mentions in an input NL utterance to a target database that has a schema that includes multiple date-type attributes is often challenging because the date mentions in the input NL utterance may be ambiguous in that they may refer to more than one date-type attribute of the target database and/or it may not be clear which of the date-type attributes of the target database the date mention or date mentions are referring to. For example, for an NL utterance "show total profit by month" and a target database having a schema that includes the order_date date-type attribute and ship_date date-type attribute, the date mention "month" in the NL utterance can be considered ambiguous because it can refer to either the order_date date-type attribute or the ship_date date-type attribute of the target database. In another example, for an NL utterance "show average profit across product categories in 2022" and the same target database, the date mention "2022" can be considered ambiguous because it too can refer to either the order_date date-type attribute or the ship_date date-type attribute of the target database.

In transforming such NL utterances to logical forms, for each ambiguous date mention in an input NL utterance, the NL2LF model will typically randomly select one of the date-type attributes of the target database and link that randomly selected date-type attribute to the respective ambiguous date mention. However, randomly selecting date-type attributes for the output logical form can cause confusion in downstream tasks (e.g., query execution) because the downstream tasks do not know which date-type attributes in the output logical form were randomly selected and/or that the date mentions that they are linked to are intending to refer to those date-type attributes. As a result, queries may execute erroneously, data may be failed to be retrieved, results may be inaccurate, and so on.

The developed approach described herein addresses these challenges and others by encoding the uncertainty of ambiguous date mentions in input NL utterances and including the encoded uncertainty in the output logical form. To do so, in a training phase, the developed approach automatically augments training examples (tuples of an NL utterance, its corresponding logical form, and database schema information) and trains the NL2LF model with the augmented training data. By automatically augmenting training examples and training the NL2LF model with these augmented training examples, the NL2LF can recognize date ambiguities in input NL utterances and do so without any manual (and costly) training data annotation. In an inference phase, the developed approach augments the input information (e.g., input NL utterances) to encode the date ambiguities in the input information to be represented in the predicted logical form. By teaching the NL2LF model identify ambiguous date mentions in input NL utterances and to represent such ambiguous date mentions in the output logical forms for those NL utterances, downstream tasks can be alerted as to the ambiguity and take a certain action in response thereto. For logical forms that include a date-type attribute that is designated that it is linked to an ambiguous date mention in the input NL utterance, the downstream task can select a default date-type attribute in the target data, present a disambiguation prompt to the end user requesting more information, and the like. As such, confusion in downstream takes can be avoided and query accuracy and execution, data retrieval, result accuracy, and the like, can be improved.

In various embodiments, a method includes accessing training data including a set of training examples, wherein each training example of the set of training examples includes a natural language utterance, a logical form corresponding to the natural language utterance, and database schema information, wherein the database schema information includes a date-type attribute; generating augmented training data including a set of augmented training examples and the set of training examples, wherein each augmented training example of the set of augmented training examples corresponds to at least one training example of the set of training examples, and generating each augmented training example of the set of augmented training examples includes: modifying a particular natural language utterance of a particular training example of the set of training examples, modifying a particular logical form of the particular training example, and modifying particular database schema information of the particular training example, wherein modifying the particular database schema information includes adding an additional date-type attribute to the particular database schema information; training a machine learning model with the augmented training data to generate a trained machine learning model; and providing the trained machine learning model.

As used herein, when an action is "based on" something, this means the action is based at least in part on at least a part of the something. As used herein, the terms "similarly," "substantially," "approximately" and "about" are defined as being largely but not necessarily wholly what is specified (and include wholly what is specified) as understood by one of ordinary skill in the art. In any disclosed embodiment, the term "similarly," "substantially," "approximately," or "about" may be substituted with "within [a percentage] of" what is specified, where the percentage includes 0.1, 1, 5, and 10 percent.

Bot Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bots to communicate with end users through a messaging application. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, the bot may be associated with a Uniform Resource Identifier (URI). The URI may identify the bot using a string of characters. The URI may be used as a webhook for one or more messaging application systems. The URI may include, for example, a Uniform Resource Locator (URL) or a Uniform Resource Name (URN). The bot may be designed to receive a message (e.g., a hypertext transfer protocol (HTTP) post call message) from a messaging application system. The HTTP post call message may be directed to the URI from the messaging application system. In some examples, the message may be different from a HTTP post call message. For example, the bot may receive a message from a Short Message Service (SMS). While discussion herein refers to communications that the bot receives as a message, it should be understood that the message may be an HTTP post call message, a SMS message, or any other type of communication between two systems.

End users interact with the bot through conversational interactions (sometimes referred to as a conversational user interface (UI)), just as end users interact with other people. In some cases, the conversational interactions may include the end user saying "Hello" to the bot and the bot responding with a "Hi" and asking the end user how it can help. End users also interact with the bot through other types of interactions, such as transactional interactions (e.g., with a banking bot that is at least trained to transfer money from one account to another), informational interactions (e.g., with a human resources bot that is at least trained check the remaining vacation hours the user has), and/or retail interactions (e.g., with a retail bot that is at least trained for discussing returning purchased goods or seeking technical support).

In some examples, the bot may intelligently handle end user interactions without intervention by an administrator or developer of the bot. For example, an end user may send one or more messages to the bot in order to achieve a desired goal. A message may include certain content, such as text, emojis, audio, image, video, or other method of conveying a message. In some examples, the bot may automatically convert content into a standardized form and generate a natural language response. The bot may also automatically prompt the end user for additional input parameters or request other additional information. In some examples, the bot may also initiate communication with the end user, rather than passively responding to end user utterances.

A conversation with a bot may follow a specific conversation flow including multiple states. The flow may define what would happen next based on an input. In some examples, a state machine that includes user defined states (e.g., end user intents) and actions to take in the states or from state to state may be used to implement the bot. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage the bot in a conversation to order pizza, where the user's intent would be represented through the utterance "order pizza." A user intent can be directed to a particular task that the user wishes the bot to perform on behalf of the user. Therefore, utterances reflecting the user's intent can be phrased as questions, commands, requests, and the like.

In the context of the configuration of the bot, the term "intent" is also used herein to refer to configuration information for mapping a user's utterance to a specific task/action or category of task/action that the bot can perform. In order to distinguish between the intent of an utterance (i.e., a user intent) and the intent of the bot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the bot to enable the intent classifier to subsequently determine whether an input utterance from a user matches the order pizza intent. Bot intents may be associated with one or more dialog flows for starting a conversation with the user and in a certain state. For example, the first message for the order pizza intent could be the question "What kind of pizza would you like?" In addition to associated utterances, bot intents may further comprise named entities that relate to the intent. For example, the order pizza intent could include variables or parameters used to perform the task of ordering pizza (e.g., topping 1, topping 2, pizza type, pizza size, pizza quantity, and the like). The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users 104 of DABP 102 to create and deploy digital assistants or chatbot systems. DABP 102 can be used to create one or more digital assistants (or DAs) or chatbot systems. For example, as shown in FIG. 1, users 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is a tool that helps users of the digital assistant accomplish various tasks through natural language conversations. A digital assistant can be implemented using software only (e.g., the digital assistant is a digital tool implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some examples, a user utterance 110 can be in audio input or speech form, such as when a user says or speaks something that is provided as input to digital assistant 106. The utterances are typically in a language spoken by the user. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some examples, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user of digital assistant 106 or are the results of conversion of input speech utterances to text form. This however is not intended to be limiting or restrictive in any manner.

For example, a user input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some examples, this processing involves a series or pipeline of processing steps including, for example, understanding the meaning of the input utterance, determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining, and reforming the utterance to develop a better understandable form (e.g., logical form) or structure for the utterance. Generating a response may include using NLG techniques.

The NLU processing performed by a digital assistant, such as digital assistant 106, can include various NLP related tasks such as sentence parsing (e.g., tokenizing, lemmatizing, identifying part-of-speech tags for the sentence, identifying named entities in the sentence, generating dependency trees to represent the sentence structure, splitting a sentence into individual clauses, analyzing individual clauses, resolving anaphoras, performing chunking, and the like). In certain examples, the NLU processing is performed by digital assistant 106 itself. In some other examples, digital assistant 106 may use other resources to perform portions of the NLU processing. For example, the syntax and structure of an input utterance sentence may be identified by processing the sentence using a parser, a part-of-speech tagger, and/or a NER. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain examples, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, 116-3, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain examples, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a customer relationship management (CRM) bot for performing functions related to customer relationship management, an enterprise resource planning (ERP) bot for performing functions related to enterprise resource planning, a human capital management (HCM) bot for performing functions related to human capital management, etc. This way the end user or consumer of the digital assistant need only know how to access the digital assistant through the common master bot interface and behind the scenes multiple skill bots are provided for handling the user request.

In certain examples, in a master bot/child bots' infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain examples, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain examples, at a high level, creating or customizing a skill bot involves the following steps:
(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot
Each of the above steps is briefly described below.

(1) Configuring settings for a new skill bot-Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?," "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain examples, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot-A skill bot is configured to receive user input in the form of utterances parse or otherwise process the received input and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain examples, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain examples, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain examples, the dialog flow definition for a skill bot contains three sections:

(a) a context sections
(b) a default transitions section
(c) states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition name a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill, they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) Unresolved Intent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
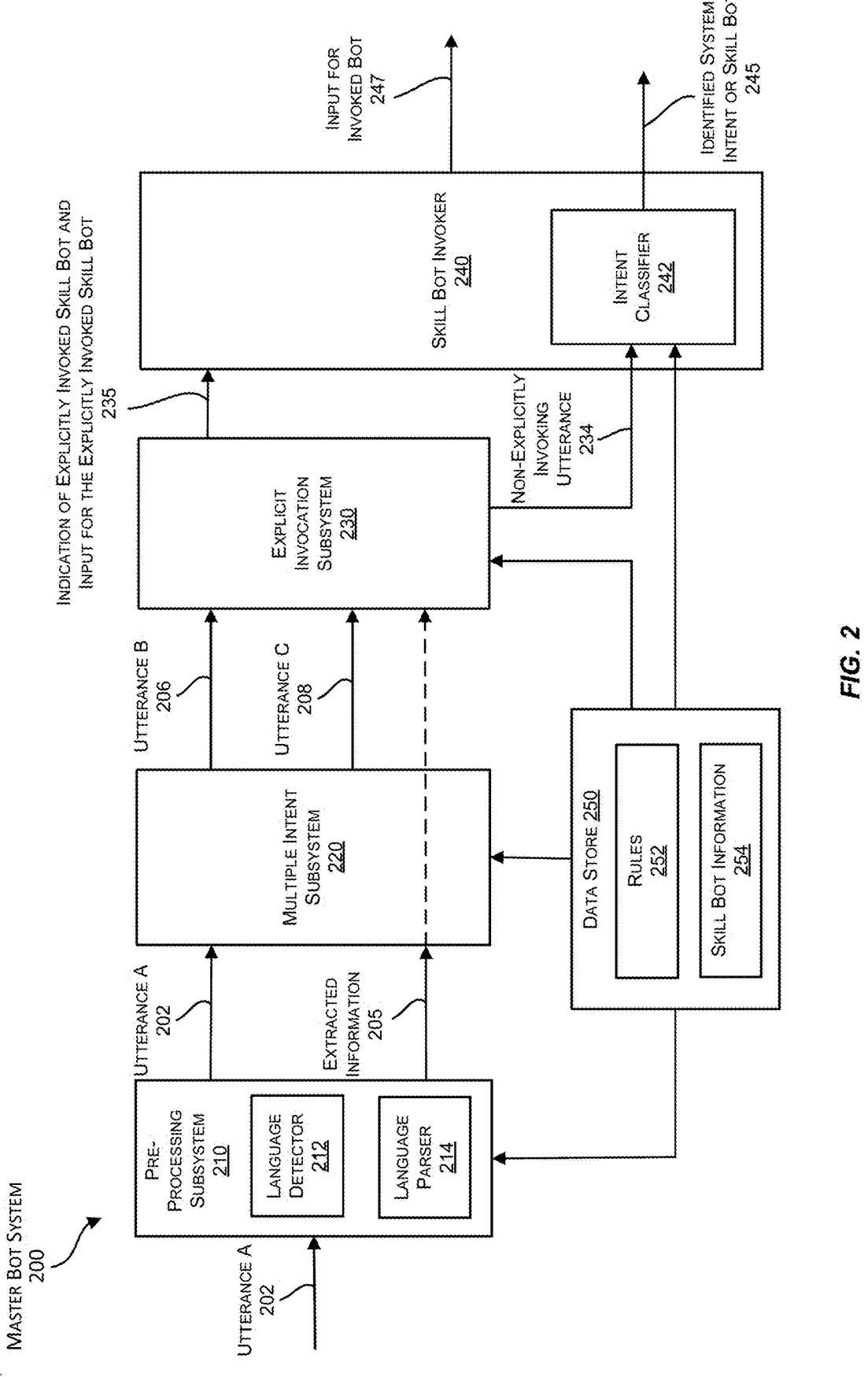
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g., a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
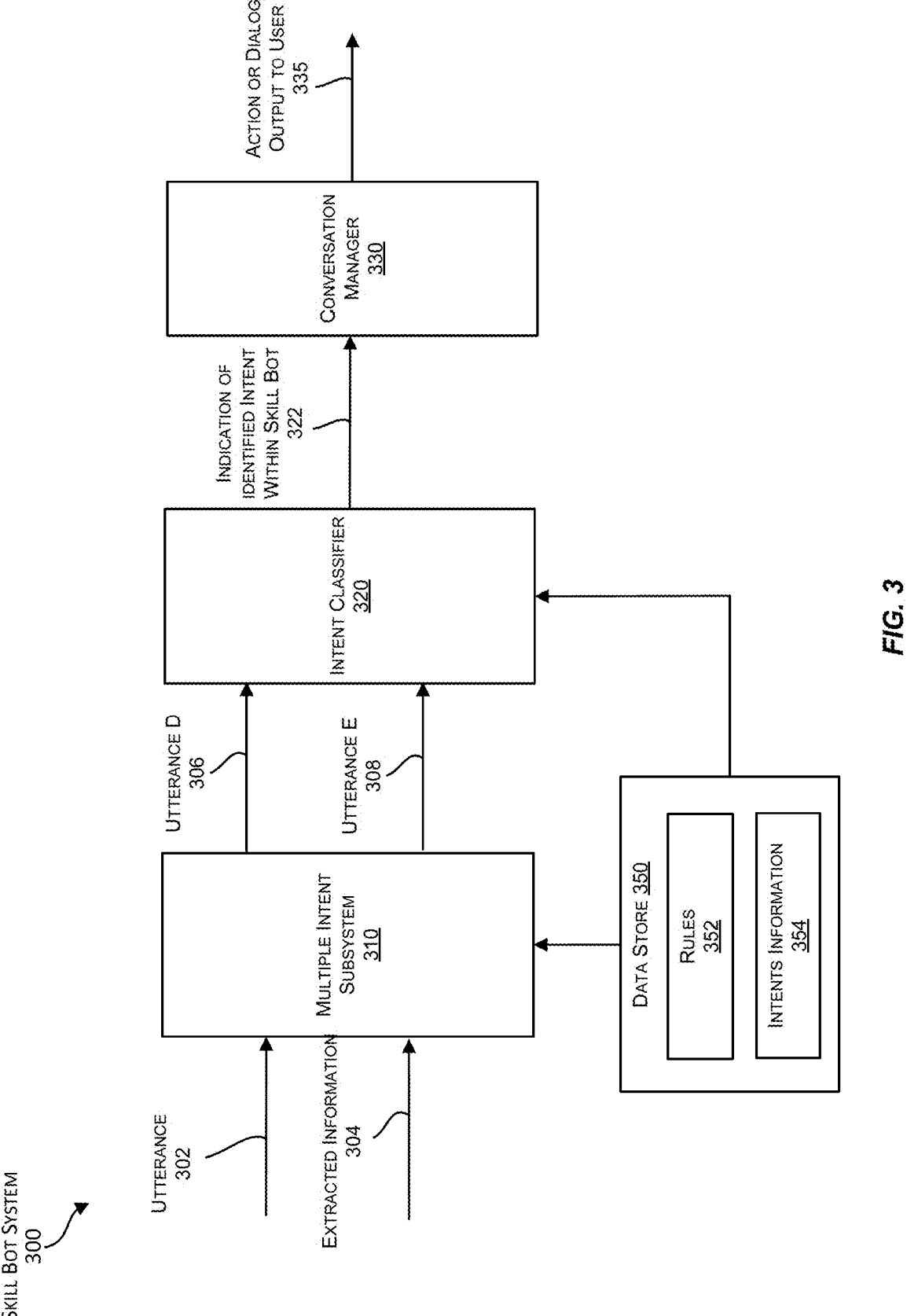
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot), or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent (e.g., "Place a pizza order using payment account X, then place a pizza order using payment account Y").

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot," then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS

220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Converting a Natural Language Utterance to a Logical Form

A NL2LF system or a conversation to MRL (C2MRL such as conversation-to-Oracle Meaning Representation Language (C2OMRL)) system is powered by a deep learning model configured to convert a natural language (NL) utterance (e.g., a query posed by a user using a digital assistant or chatbot) into a logical form, for example, an intermediate database query language such as OMRL. The logical form can be used to generate a query in a specific system query language (e.g., SQL), which can then be executed for querying a system such as a database to obtain an answer to the user's utterance.

Figure 4:
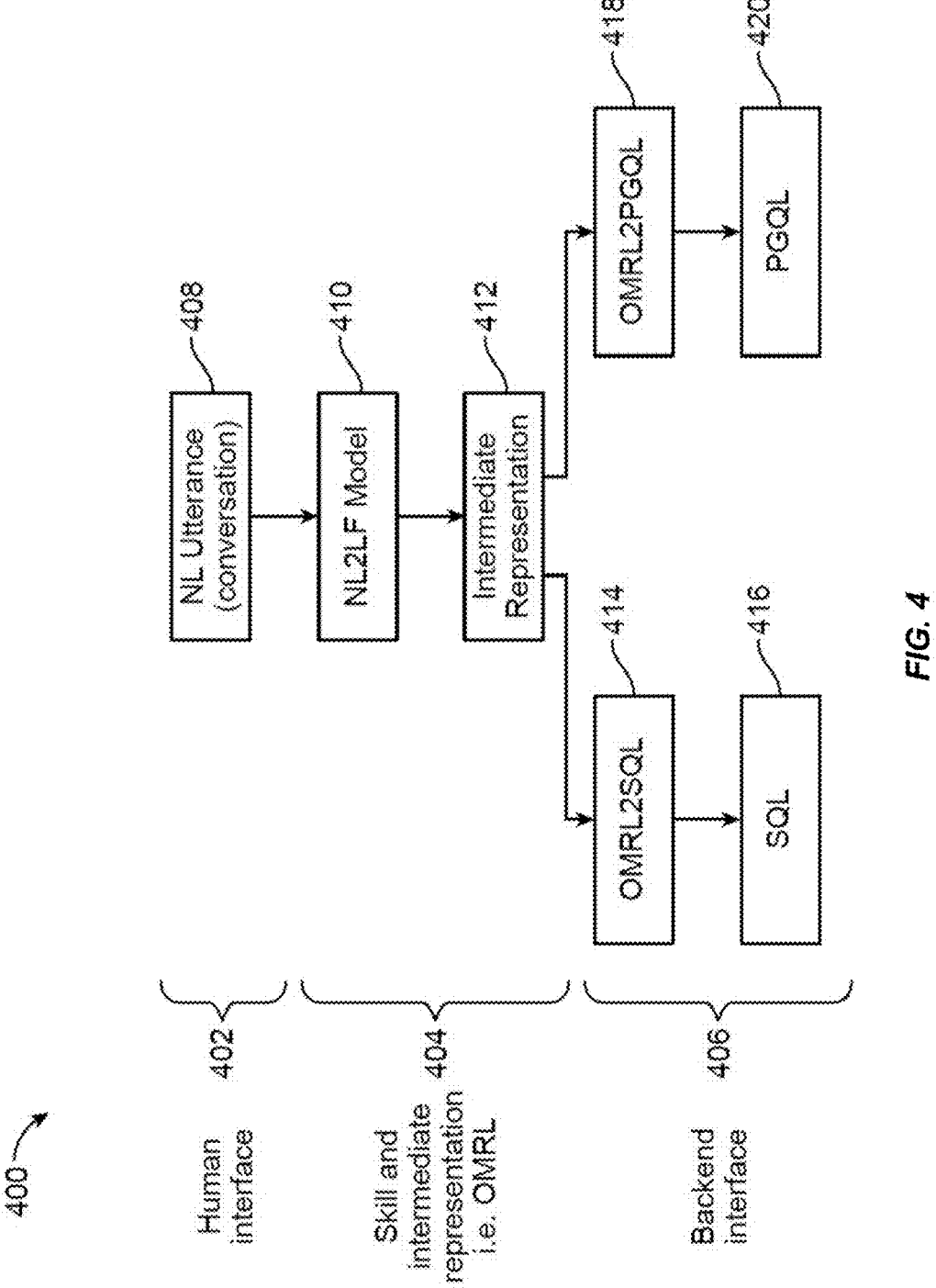
FIG. 4 is a simplified block diagram illustrating an overview of a NL2LF or C2OMRL architecture and process for generating a query for a backend interface starting with a natural language utterance, in accordance with various embodiments.

FIG. 4 is a block diagram 400 illustrating an overview of a C2MRL architecture and process for generating a query for a backend interface 406 starting with a NL utterance 408, e.g., as received via a human interface 402. For example, the human interface 402 can be a chatbot system that receives spoken speech and translates it to a text utterance, as described above, or a system where a user types in a request in natural language, or other suitable interfaces. The NL utterance 408 can be in the form of part of a conversation (e.g., "Hello, can you tell me how many orders we need to send out tomorrow?" or "Search for all employees with first name starting with 'S' and living in California.").

The NL utterance 408 is provided to a NL2LF model 410, which converts the NL utterance 408 to an intermediate representation 412 (e.g., MRL or OMRL). The NL2LF model 410 is a machine learning model trained to generate intermediate representations 412 from NL utterances 408. The NL2LF model 410 includes multiple layers and algorithms for generating intermediate representations 412 from NL utterances 408, as described herein in further detail. In some instances, as depicted in FIG. 4, the NL2LF model 410 is a C2OMRL model for converting a conversational utterance to OMRL 412. The NL2LF model 410 may be described interchangeably herein with C2OMRL, although it should be understood that the techniques described herein can be applied to models configured to generate other intermediate representation 412 formats. The intermediate representation 412 is a logical representation of the utterance, which is configured to be translatable into a specific system query language. In some examples, the intermediate representation 412 is OMRL, an intermediate database query language with a specialized schema and interface specification. The intermediate representation 412 may be described interchangeably herein with OMRL, although it should be understood that the techniques described herein can be applied to other intermediate representation 412 formats.

The intermediate representation 412 can then be translated to one or more desired system query languages, such as SQL 416 or PGQL 420, using one or more system language translation processes, such as an OMRL2SQL 414 translation process or an OMRL2PGQL 418 translation process. The translated query (e.g., SQL 416 or PGQL 420) represents the concepts that are present in intermediate representation 412 in a manner that conforms to the requirements of the applicable system query language.

Figure 5:
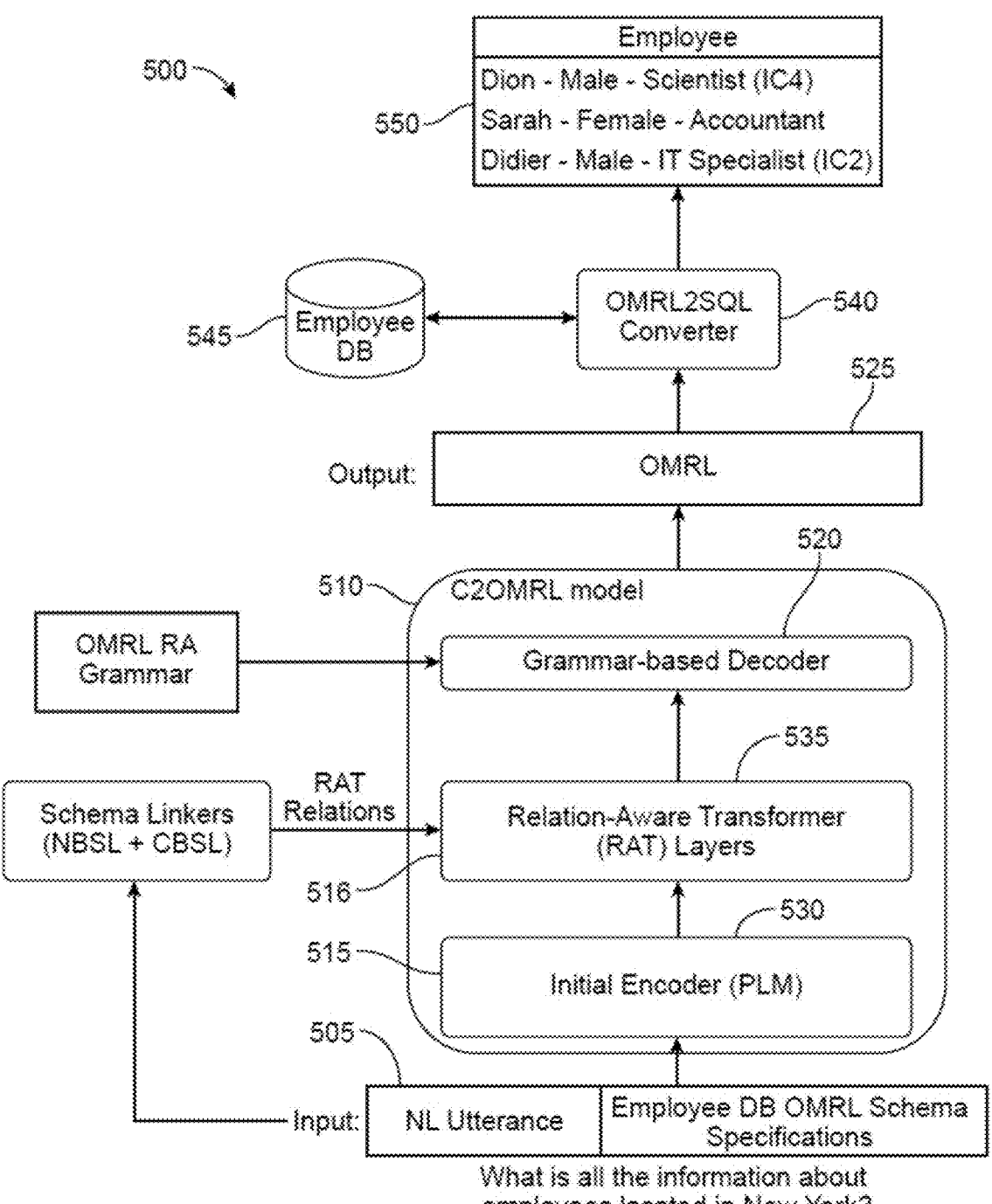
FIG. 5 is a simplified block diagram of a C2OMRL architecture in accordance with various embodiments.

FIG. 5 shows a C2OMRL system 500 powered by a machine learning model to be able to convert a NL utterance (e.g., an utterance within the Digital Assistant platform as described with respect to FIGS. 1-3) into a LF statement such as OMRL query or command, which in turn can be executed for querying an existing system such as a relational database. This machine learning model (referred to herein as the "C2OMRL semantic parser" or "C2OMRL model" or simply "parser") is trained on hundreds to thousands of annotated example pairs (natural language and logical form pairs) for translating NL utterance into a LF statement. As shown in FIG. 5, an example 505 (concatenation of a natural language utterance and the database schema, e.g., sequence of table and column names) is input into the C2OMRL model 510. The example 505 is first processed by the encoder component 515, which captures the representation of the natural language utterance and the database schema contextually. The decoder 520 then receives the encoded input and predicts the logical form 525 (e.g., OMRL, which is a SQL-like statement or query) based on the captured representation of the natural language utterance and the database schema.

In the C2OMRL model 510, the encoder component 515 includes two encoders (1) a first encoder, which is a Pretrained Language Model (PLM) 530; and (2) a second encoder, which is a Relation-Aware Transformer (RAT) 535. The PLM 530 is used to embed the natural language utterance and database schema, as it captures a representation of the natural language utterance and the database schema contextually. In certain instances, a transformer-based PLM called Decoding-enhanced BERT with disentangled attention (DeBERTa) is used as the PLM 530. (See He et al., DeBERTaV3: Improving DeBERTa using ELECTRA-Style Pre-Training with Gradient-Disentangled Embedding Sharing (2021), the entire contents of which are hereby incorporated by reference for all purposes). Transformer-based PLMs learn universal language representations from large volumes of text data using self-supervised learning and transfer this knowledge to downstream tasks. These models provide good background knowledge to downstream tasks which avoids training of downstream models from scratch. The RAT 535 encodes the relations between entities in the database schema and words in the natural language utterance (these relations are called "schema linking" relations). Use of RATs is described in Wang et al., RAT-SQL: Relation-Aware Schema Encoding and Linking for Text-to-SQL Parsers (2021), the entire contents of which is incorporated herein by reference for all purposes.

The decoder 520 is based on a bottom-up generative process (i.e., the bottom-up generative process generates a tree from left to right), where the final generation output is a OMRL tree (i.e., a tree-based structure that represents the full OMRL logical form) that can be mapped to a final OMRL logical form 525. The bottom-up generative process is implemented using a beam search, which is a heuristic search algorithm that explores a graph by expanding the most promising node in a limited set. The beam search works in steps (e.g., ~10 steps), also called "beam levels". At each step (e.g., "step i"), the beam search algorithm generates a number F of possible sub-trees for an input sequence that can be obtained by extending the current sub-trees (from step "i–1"), and then selects the top-K sub-trees (known as beam width) for retention using the conditional probability associated with each sub-tree. The conditional probability is referred to herein as a "raw beam score", and thus the top-K intermediate results (to be considered in the next generative step) are the K ones with the highest raw beam scores. Additional information for the bottom-up generative process is found in "Ohad Rubin and Jonathan Berant. 2021. SmBoP: Semi-autoregressive Bottom-up Semantic Parsing, in Proceedings of the 2021 Conference of the North American Chapter of the Association for Computational Linguistics: Human Language Technologies, pages 311-324, Online. Association for Computational Linguistics," the entire contents of which is hereby incorporated by reference for all purposes. The final decoder 520 output is the sub-tree with the highest raw beam score at the last step N.

For example, at a first step (beam level 1), the encoded input utterance and database schema are input to the decoder 520 and the decoder 520 will apply a SoftMax function to all the tokens in a vocabulary or grammar to find the best alternatives for a first sub-tree (e.g., a first token or node of a tree). To generate the number F of possible sub-trees (known as the frontier), the decoder 520 makes predictions representing the conditional probability of each token in the vocabulary or grammar coming next in a sequence (the likely value of $y_{i+1}$, conditioned on the previous tokens $y_1, \ldots, y_i$ and the context variable c, produced by the encoder to represent the input sequence). The vocabulary or grammar is obtained from a corpus comprising words or terms in the target logical form (e.g., OMRL). In certain instances, the corpus further comprises rules for the words or terms in the target logical form. The rules define how the words or terms may be used to create a proper phrase or operation in the target logical form (e.g., the combination of terms that work together for a proper OMRL query). The beam search algorithm then selects the top-K sub-trees with the highest conditional probability or raw beam score as the most likely possible choices for the time step. In this example, suppose the top-K sub-trees or beam width is 2 and that the sub-trees with the highest conditional probabilities $P(y_1|c)$ in the first step are sub-tree_1 and sub-tree_12. The top-K results can be a selectable and/or optimizable hyperparameter. Sub-tree_1 and sub-tree_12 and the corresponding conditional probabilities or raw beam scores are saved in memory.

At a second step (beam level 2), the two selected trees (sub-tree_1 and sub-tree_12) from the first step are input to the decoder 520 and the decoder 520 will apply the softmax function to all the tokens in the vocabulary or grammar to find the two best alternatives for the second sub-tree (e.g., a first and second token or node of a tree). While doing this, the beam search algorithm will determine the combination of the first and second tokens or nodes that are most likely to form a pair or second sub-tree using the conditional probabilities. In other words, for all $y_2$ ÅY, the beam search algorithm computes $P(\text{sub-tree}\_1, y_2|c) = P(\text{sub-tree}\_1|c)P(y_2|\text{sub-tree}\_1, c)$, $P(\text{sub-tree}\_12, y_2|c) = P(\text{sub-tree}\_12|c)P(y_2|\text{sub-tree}\_12, c)$, and select the largest two among these values, for example $P(\text{sub-tree}\_22|c)$ and $P(\text{sub-tree}\_37|c)$. Sub-tree_22 and sub-tree_37 and the corresponding conditional probabilities or raw beam scores are saved in memory.

At a third step (beam level 3), the two selected trees (sub-tree_22 and sub-tree_37) from the second step are input to the decoder 520 and the decoder 520 will apply the softmax function to all the tokens in the vocabulary or grammar to find the two best alternatives for the third sub-tree (e.g., a first, second, and third token or node of a tree). While doing this, the beam search algorithm will determine the combination of the first, second, and third tokens or nodes that are most likely to form a string or third sub-tree using the conditional probabilities. In other words, for all $y_3 \in Y$, the beam search algorithm computes $P(\text{sub-tree}\_22, y_3|c) = P(\text{sub-tree}\_22|c)P(y_3|\text{sub-tree}\_22, c)$, $P(\text{sub-tree}\_37, y_3|c) = P(\text{sub-tree}\_37|c)P(y_3|\text{sub-tree}\_37, c)$, and select the top-K sub-trees. The top-K sub-trees and the corresponding conditional probabilities or raw beam scores are saved in memory. This process continues until N number of beam levels is completed (this could be an optimized or selected hyperparameter). The final model output is the sub-tree with the highest conditional probability or raw beam score at the last step N (beam level N). The tokens or nodes of this final sub-tree can then be mapped to a final logical form such as OMRL logical form statement 525.

The predicted MRL logical form statement 525 (i.e., the OMRL tree with the highest raw beam score at the last step N) can then be input into a language converter 540 such as (OMRL2SQL) to translate the meaning representation to a systems language query or command such as SQL, APIs, REST, GraphQL, PGQL, etc. The systems language query or command can then be used to query or execute an operation on a system 545 (e.g., a relational database) and obtain an output 550 as a result of the query or command.

Managing Ambiguous Date Mentions

As discussed above, in transforming NL utterances to logical forms, linking date mentions in an NL utterance to the appropriate date-type attributes of a target database is often challenging due to the ambiguities that can be introduced by the date mentions. The database schema may include several date-type attributes, but the date mention in the NL utterance may not clearly refer to any one of those attributes and/or may refer to more than of those attributes. For example, for the input NL utterance "show total profit by month," the date mention "month" may present an ambiguity if the target database schema includes multiple date-type attributes such as "order date" and "ship date" and the model cannot predict with certainty which of those date-type attributes the date mention "month" is referring to. Traditional NL2LF models, when confronted with an input NL utterance that includes a date mention in which the NL2LF models cannot determine with certainty which date-type attribute of the target database the date mention is referring to will randomly select a date-type attribute from the target database schema and link it to the data mention in the predicted output logical form. However, including randomly selected date-type attributes in output logical forms can cause confusion in downstream tasks and result in, among other things, erroneous query accuracy and execution, failed data retrieval, inaccurate results, and the like.

The developed approach described herein addresses these challenges and others by encoding the uncertainty of ambiguous date mentions in input NL utterances and including the encoded uncertainty in the output logical form. To do so, in a training phase, the developed approach automatically augments training examples (tuples of an NL utterance, its corresponding logical form, and database schema information) and trains the NL2LF model with the augmented training data. By automatically augmenting training examples and training the NL2LF model with these augmented training examples, the NL2LF can recognize date ambiguities in input NL utterances and do so without any manual (and costly) training data annotation. In an inference phase, the developed approach augments the input information (e.g., input NL utterances) to encode the date ambiguities in the input information to be represented in the predicted logical form. By teaching the NL2LF model identify ambiguous date mentions in input NL utterances and to represent such ambiguous date mentions in the output logical forms for those NL utterances, downstream tasks can be alerted as to the ambiguity and take a certain action in response thereto. For logical forms that include a date-type attribute that is designated that it is linked to an ambiguous date mention in the input NL utterance, the downstream task can select a default date-type attribute in the target data, present a disambiguation prompt to the end user requesting more information, and the like. As such, confusion in downstream takes can be avoided and query accuracy and execution, data retrieval, result accuracy, and the like, can be improved.

Figure 6:
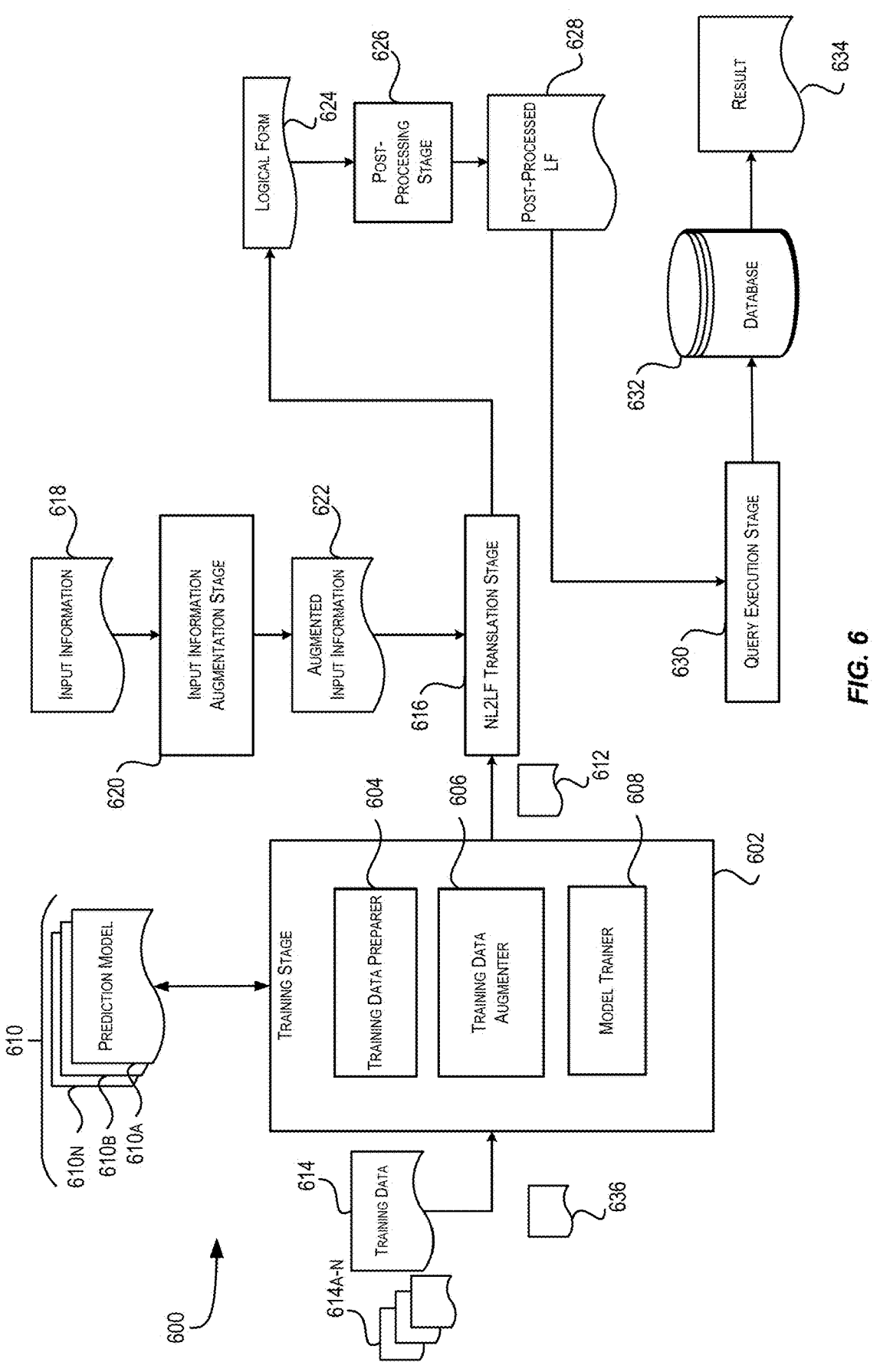
FIG. 6 is a simplified block diagram of an example of a system for training, providing, and using machine learning models that can manage ambiguous date mentions in transforming natural language utterances to logical forms in accordance with various embodiments.

FIG. 6 is a simplified block diagram of an example of a system for training, providing, and using machine learning models that can manage ambiguous date mentions in transforming NL utterances to LFs. As shown in FIG. 6, the system 600 in this example includes various stages: a training stage 602 to train and provide trained machine learning models, a NL2LF translation stage 616 to translate NL utterances to LFs using a trained machine learning model provided by the training stage 602, an input information augmentation stage 620 to prepare input information for the NL2LF translation stage 618, a post-processing stage 626 to process LFs translated by the NL2LF translation stage 616, and a query execution stage 630 to execute post-processed LFs. In some implementations, although not shown, the training stage 602 can be included a training system or subsystem of the system 600 and the NL2LF translation stage 616, the input information augmentation stage 620, the post-processing stage 626, and the query execution stage 630 can be part of a query execution system or subsystem of the system 600.

The training stage 602 builds and trains machine learning models 610A-610N ('N' represents any natural number) to be used by the other stages (which may be referred to herein individually as a model 610 or collectively as the models 610). An example of a model 610 built and trained by the training stage 602 is NL2LF model 612. Each of the models 610, including the NL2LF model 612, can be any suitable machine learning model that is built and trained to process and understand NL and perform other tasks based on NL such as transforming a NL utterance into a LF such as OMRL, recognizing named entities, and the like. Each of the models 610, including the NL2LF model 612, can be and/or based on the NL2LF model 410, the C2OMRL model 510, a pre-trained large language model, a pre-trained semantic parser, a combination thereof, and the like. Additionally, each of the models 610, including the NL2LF model 612, can be built and/or trained based on one or more architectures such as transformer architectures, encoder-decoder architectures, encoder only architectures, decoder only architectures, a combination thereof, and the like.

To train the models 610, the training stage 602 includes various components such as training data preparer 604, training data augmenter 606, and model trainer 608. The training data preparer 604 facilitates the process of loading training data 614, splitting the training data 614 into training and validation sets (614A-N) so that the system can train and test the models 610, and performing basic natural language pre-processing (e.g., standardization, normalization, tokenizing data, annotation, augmentation, embedding, etc.). The training data 614 includes training examples. Each training example includes a NL utterance, a LF corresponding to the NL utterance (e.g., a NL utterance and OMRL representation of the NL utterance), and database schema information corresponding to the NL utterance and the logical form (e.g., database schema information of a database that is to be queried based on the NL utterance and using the LF). The LF of each respective training example can serve as ground truth information for each respective training example. An example of a training example is shown in Table 1.

TABLE 1

| Schema | | | | |
|---|---|---|---|---|
| Schema_ID | Table(s) | Attributes | NL Utterance | OMRL Logical Form |
| Superstore_1 | Orders | Sales; Profit Order_Date; Ship_Date; Category; Carrier | Show average profit across product categories with a 2022 ship date | SELECT AVG (Profit), Product_Category FROM Orders WHERE Ship_Date = '2022' GROUP BY Product_Category |

The training examples included in the training data 614 can be obtained from one or more pre-existing datasets (e.g., Spider, SParC, CoSQL datasets and/or others) and/or accessed from one or more sources such as a database, a computing system, a customer or client, and the like. In some instances, the training examples included in the training data 614 can be obtained from and/or generated by humans (e.g., crowd-sourced human annotators). In other instances, the training examples included in the training data 614 can be automatically generated and/or retrieved from libraries. The NL utterances of the training examples of the training data 614 can include text or input features associated with text such as tokens.

Database schema defines how data is organized within a database such as a relational database. A relational database can be formed of one or more tables with each table of the one or more tables including one or more columns with each column of the one or more columns of a respective table of the one or more tables including one or more values. Each column of the one or more columns of a respective table of the one or more tables represents an attribute of the respective table or database. Each table and column of a relational database can be associated with a unique identifier (e.g., an attribute ID), which can include one or more words (e.g., "ship_date"). In some instances, the unique identifier for a respective column of a respective table or the database can be indicative of an attribute represented by the respective column (e.g., the unique identifier "ship date" can indicate that the respective column represents a date-type attribute of the respective table or database). In some instances, the database schema information can include metadata that identifies a type and a natural language name for each column/attribute of the database (e.g., the "ship_date" attribute being a date type attribute with the natural language name "ship date"). For example, the metadata can identify columns corresponding to date-type attributes as date-type columns. In some instances, one or more columns of the relational database may serve as a primary key in which each of the values of the one or more columns that serve as the primary key are unique from each other. In some instances, one or more columns of the relational database may serve as a foreign key which serves to the link the table which includes the one or more columns with another table in the relational database. In some instances, the database schema information for a database includes one or more data structures for storing the unique identifiers of the one or more tables and/or the unique identifiers of the one or more columns. The unique identifiers can be stored by the training data preparer 604 in one or more vectors and/or matrices. In some embodiments, a data structure storing schema information for a relational database can store a directed graph representing the unique identifiers and values.

The splitting of the training data 614 into training and validation sets 614A-614N may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting. Before or after splitting, basic NL pre-processing may be performed on the training data 614 by the training data preparer 604. In some instances, the pre-processing includes tokenizing the NL utterances of the training data 614. Tokenizing is splitting a phrase, sentence, paragraph, or an entire text document into smaller units, such as individual words or terms. Each of these smaller units are called tokens. In some instances, the tokens for data assets 614 may then be embedded to word embeddings (e.g., contextualized word embeddings). A word embedding is a learned representation for text where words that have the same meaning have a similar representation. Word embeddings are generated by embedding techniques where individual words are represented as real-valued vectors in a predefined vector space so they can be understood by deep learning algorithms. The embedding techniques can be joint or individual embedding techniques such as including an embedding layer within the deep learning algorithm or using a separate model such as a BERT-based pretrained language model (e.g., BERT, ROBERTa, and DeBERTa). BERT-based models are pretrained language models that use self-supervised learning to learn the deep meaning of words and contexts.

Figure 7A:
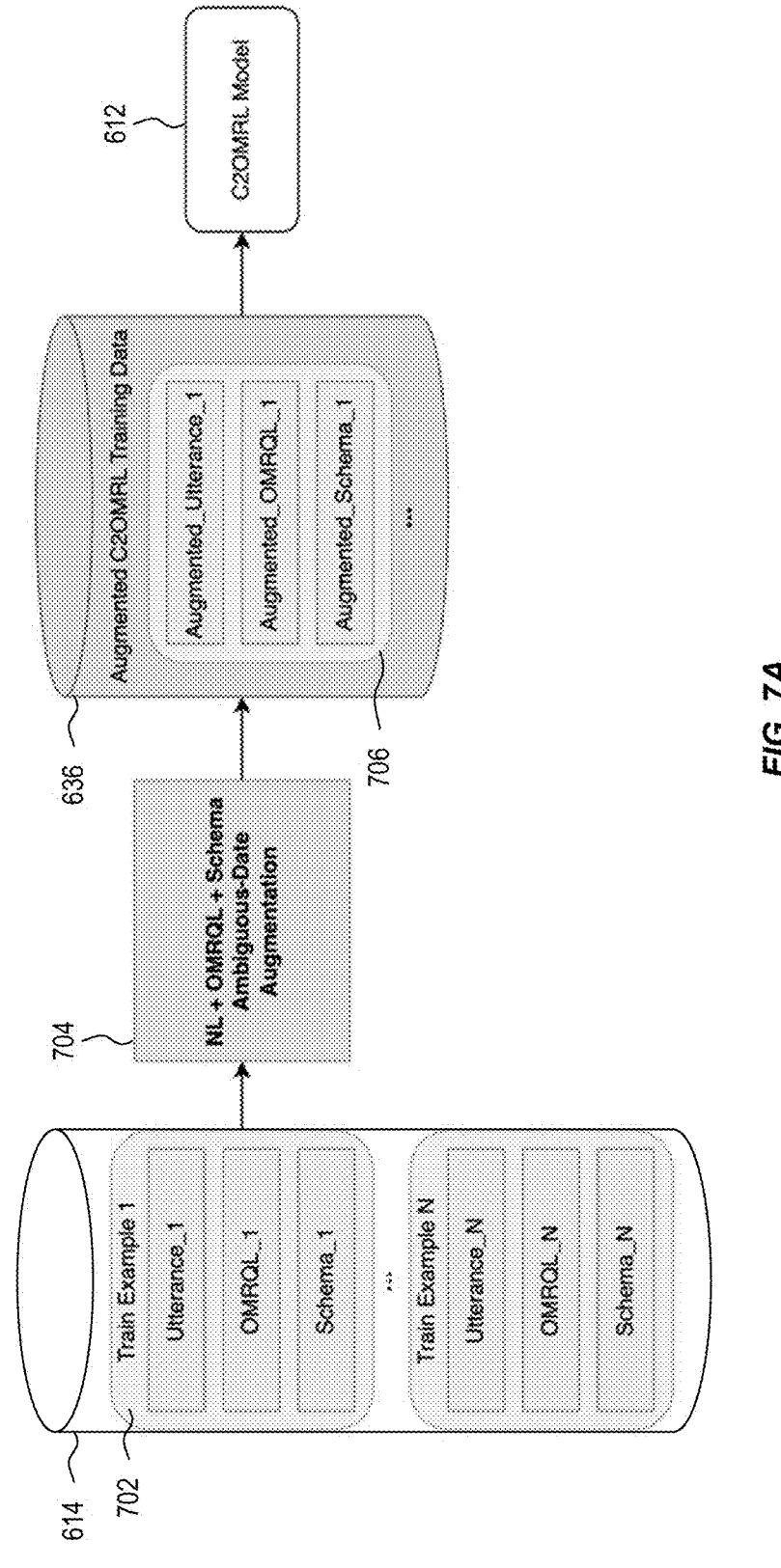
FIG. 7A illustrates an example a flow for generating augmented training data in accordance with various embodiments.

The training data augmenter 616 generates augmented training data 636, which is used by the model trainer 608 to train the models 610. An example of a flow 700A for generating the augmented training data 636 is shown in FIG. 7A. As shown in FIG. 7A, the training data augmenter 616 generates the augmented training data 636 by selecting training examples 702 in the training data 614, performing augmentation 704 on the selected training examples to generate augmented training examples 706, and combining the augmented training examples 706 with the training examples in the training data 614 to generate the augmented training data 636. As described above and as further shown in FIG. 7A, the augmented training data 636 can be used to train the model 612 (e.g., a C2OMRL model). In some implementations, the training examples can be selected as a step of the augmentation 704 or prior to the augmentation 704.

Figure 7B:
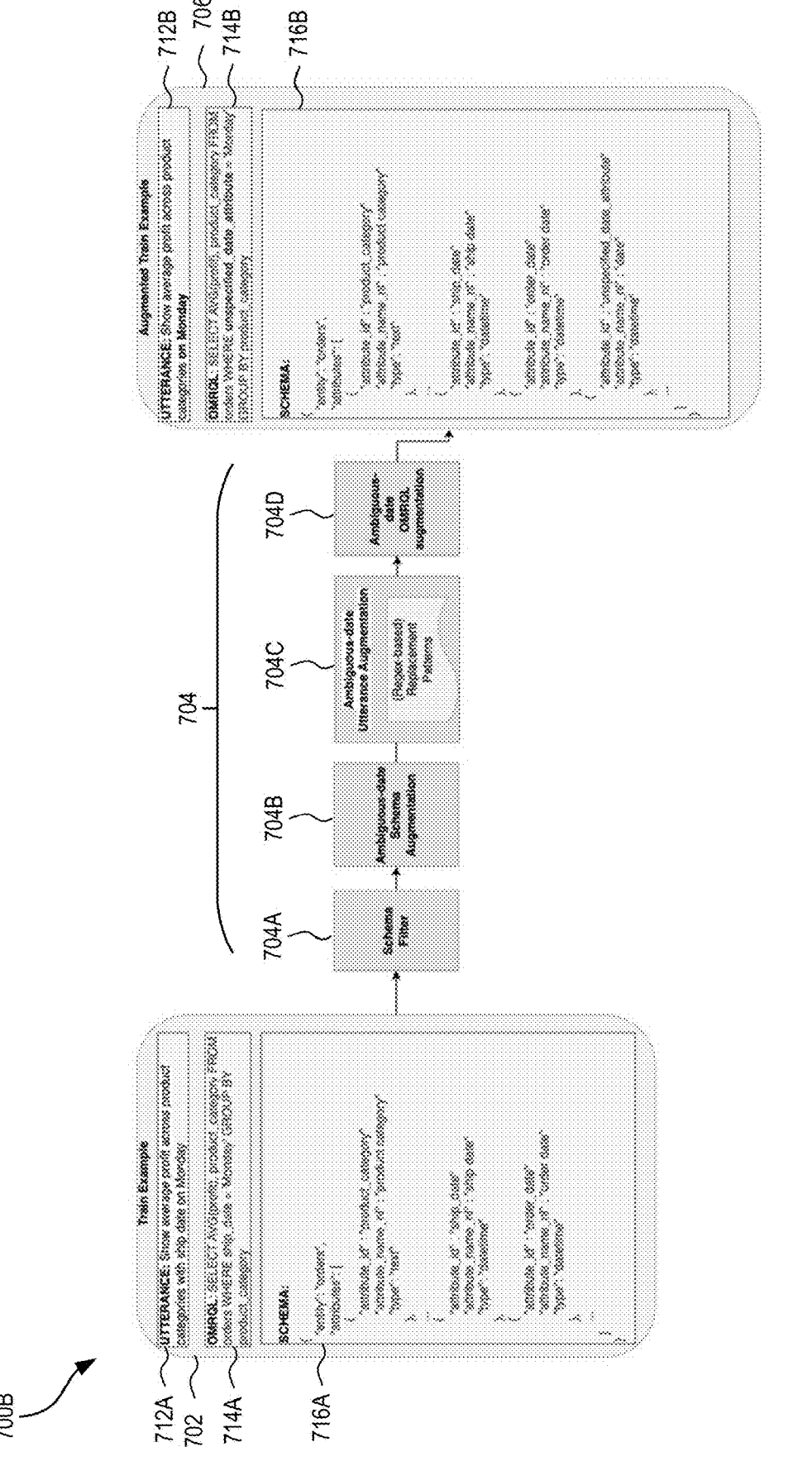
FIG. 7B illustrates another example of a flow for generating augmented training data in accordance with various embodiments.

The training data augmenter 616 can select the training examples 702 from the training data 614 that have certain date-type features. In some implementations, the training data augmenter 616 can select training examples from the training data 614 which include: a date mention in the NL utterance of a respective training example, a date mention in the LF of the respective training example, and database schema information of the respective training example that includes more than one date-type attribute (i.e., two or more date-type attributes). For example, as shown in FIG. 7B, which shows another example of a flow 700B for generating the augmented training data 636, the training example 702 can be selected for augmentation because the NL utterance 712A of the training example 702 includes the date mention "Monday", the LF 714A of the training example 702 includes the date mention "Monday" and the database schema information 716A of the training example 702 includes two date-type attributes, the date-type attributes "ship_date" and "order_date". As described above, the training examples can be selected as a step of the augmentation 704 or prior to the augmentation 704. In some implementations, as further shown in FIG. 7B, training examples in the training data 614 that include date mentions in their NL utterances and LFs can be identified prior to the augmentation 704 and a schema filtering component 704A of the augmentation 704 can select training examples of the identified training examples that include database schema information having multiple date-type attributes such that training examples having certain date-type features can be augmented.

The training data augmenter 616 can augment each respective selected training example by augmenting the database schema information of the respective training example, augmenting the NL utterance of the respective selected training example, and augmenting the LF of the respective selected training example. In some implementations, as further shown in FIG. 7B, the augmentation 704 can include an Ambiguous-date Schema Augmentation component 704B for augmenting the database schema information 716A of the respective selected training example, an Ambiguous-date Utterance Augmentation component 704C for augmenting the NL utterance 712A of the respective selected training example, and an Ambiguous-date OMRQL Augmentation component 704D for augmenting the LF 714A of the respective selected training example.

The Ambiguous-date Schema Augmentation component 704B can augment the database schema information 716A of the respective selected training example to generated augmented schema information 716B by adding an additional attribute to the database schema information 716A. The additional attribute can be a date-type attribute and be uniquely identified in the augmented database schema information 716B as "unspecified_date_attribute". The additional attribute can serve as a date-type attribute which can be linked to ambiguous date mentions in input NL utterances. Examples of database schema information and augmented database schema information are shown in Table 2.

mention "Monday" becomes ambiguous because it could refer to the "ship_date" attribute or the "order_date" attribute of the database schema information.

The date mention or date mentions in the NL utterance 712A of the respective selected training example can be transformed into an ambiguous date mention or ambiguous date mentions by: (i) extracting the natural language name or natural language names of the date-type attribute or date-type attributes in the LF 714A of the respective selected training example from the database schema information 716A of the respective selected training example; (ii) generating a set of regular expression (regex) patterns using the natural language name or natural language names and a set of templates; and (iii) transforming the date mention or date mentions of the NL utterance to ambiguous date mention or date mentions by the applying the set of regex patterns to the date mention or date mentions of the NL utterance.

The natural language name or natural language names of the date-type attribute or date-type attributes in the LF 714A of the respective selected training example can be extracted from the database schema information of the respective selected training example by identifying the date-type attri-

TABLE 2

| Database Schema Information | Augmented Database Schema Information |
|---|---|
| {<br>  "entity": "orders",<br>  "attributes": [<br>    {<br>      "attribute_id" :<br>    "product_category"<br>      "attribute_name_nl" : "product<br>    category"<br>      "type": "text"<br>    },<br>    ...<br>    {<br>      "attribute_id" : "ship_date"<br>      "attribute_name_nl" : "ship date"<br>      "type": "date"<br>    },<br>    {<br>      "attribute_id" : "order_date"<br>      "attribute_name_nl" : "order date"<br>      "type": "date"<br>    },<br>    ...<br>  ]<br>} | {<br>  "entity": "orders",<br>  "attributes": [<br>    {<br>      "attribute_id" : "product_category"<br>      "attribute_name_nl" : "product<br>    category"<br>      "type": "text"<br>    },<br>    ...<br>    {<br>      "attribute_id" : "ship_date"<br>      "attribute_name_nl" : "ship date"<br>      "type": "date"<br>    },<br>    {<br>      "attribute_id" : "order_date"<br>      "attribute_name_nl" : "order date"<br>      "type": "date"<br>    },<br>    {<br>      "attribute id" :<br>    "unspecified_date_attribute"<br>      "attribute_name_nl" : "order date"<br>      "type": "date"<br>    },<br>    ...<br>  ]<br>} |

The Ambiguous-date Utterance Augmentation component 704C can augment the NL utterance 712A of the respective selected training example to generate an augmented NL utterance 712B by transforming the date mention or date mentions in the NL utterance 712A of the respective selected training example into an ambiguous date mention or ambiguous date mentions. For example, for a respective selective training example that has the database schema information shown in Table 2 and the NL utterance "Show average profit across product categories with ship date on Monday", the "Monday" date mention in the NL utterance can be transformed into an ambiguous date mention by removing the "ship date" phrase such that the augmented NL utterance becomes "Show average profit product categories on Monday." By removing "ship date" phrase, the date bute or date-type attributes in the LF 714A and, for each respective date-type attribute, extracting the natural language name associated with the respective date-type attribute from the database schema information 716A of the respective selected training example. For example, in the case of a LF "OMRQL=SELECT AVG(Profit), product_category FROM orders WHERE ship_date='Monday' GROUP By product category" and the database schema information shown in Table 2, the natural language name "ship date" can be extracted for the "ship_date" date-type attribute.

The set of regex patterns can be generated using the natural language name or natural language names and a set of templates by replacing date-type placeholder attributes of the set of templates with the natural language name or natural language names. Each respective template of the set of templates includes an attribute pattern that includes a particular arrangement of a date-type placeholder attribute and a set of words. In some implementations, an attribute pattern for a respective template includes: (i) the date-type placeholder attribute and a set of words that can precede the date-type placeholder attribute; (ii) the date-type placeholder attribute and a set of words that can follow the date-type placeholder attribute; or (iii) the date-type placeholder attribute and a set of words that can both precede and follow the date-type placeholder attribute.

Each regex pattern of the set of regex patterns can be generated from the set of templates by replacing the date-type placeholder attribute in each attribute pattern with the natural language name or natural language names of the date-type attribute or date-type attributes in the LF of the respective selected training example. As such, each respective regex pattern of the set of regex patterns includes a particular arrangement of a natural language name of a date-type placeholder attribute and a set of words. In some implementations, a word arrangement of a respective regex pattern includes: (i) the natural language name of the date-type placeholder attribute and a set of words that can precede the natural language name of the date-type placeholder attribute; (ii) the natural language name date-type placeholder attribute and a set of words that can follow the natural language name of the date-type placeholder attribute; or (iii) the natural language name of the date-type placeholder attribute and a set of words that can both precede and follow the natural language name date-type placeholder attribute. For example, in the case of the LF "OMRQL=SELECT AVG (Profit), product_category FROM orders WHERE ship_date='Monday' GROUP By product category" and the natural language name "ship date" for the date-type attribute "ship_date", a regex pattern for a respective template of the set of templates can be generated by replacing the date-type placeholder attribute of the attribute pattern of the respective template with the term "ship date".

The sets of templates and regex patterns can be associated with a set of replacement patterns. Each respective replacement pattern of the set of replacement patterns can be associated with a respective template and the regex pattern generated from the respective template. Additionally, each replacement pattern can include a set of replacement words which can be used to replace words in the NL utterance that are arranged in a pattern that matches a word pattern of one of the regex patterns of the set of regex patterns. An example of a set of templates, a set of regex patterns generated from the set of templates, a set of replacement patterns is shown in Table 3.

The date mention or date mentions of the NL utterance 712A of the respective selected training example can be transformed to an ambiguous date mention or ambiguous date mentions by: (i) identifying words in the NL utterance 712A that are arranged in a pattern that matches a regex pattern of the set of regex patterns (i.e., the word arrangement of one of the regex patterns of the set of regex patterns matches an arrangement of a set of words in the NL utterances); (ii) selecting a word from the replacement pattern that is associated with the matching regex pattern; and (iii) replacing the identified words with the selected word. For example, the words "with ship date on Monday" in the NL utterance "Show average profit across product categories with ship date on Monday" can be replaced with either an "in" or "on" of the replacement pattern {in, on} shown in Table 3 because the pattern of the words "with ship date on Monday" matches the regex pattern "{with, for, where, having} ship date {in, on}" shown in Table 3.

The Ambiguous-date OMRQL Augmentation component 704D can augment the LF of the respective selected training example by replacing the date-type attribute or date-type attributes of the LF with the additional attribute added to the database schema information. For example, in the case of the LF "OMRQL=SELECT AVG (Profit), product_category FROM orders WHERE ship_date='Monday' GROUP By product category", the augmented LF "OMRQL=SELECT AVG (Profit), product_category FROM orders WHERE unspecified_date_attribute='Monday' GROUP By product category" can be generated by replacing the "ship_date" date-type attribute with the additional attribute "unspecified_ date_attribute".

As discussed above, each respective selected training example 702 can be augmented to generate a respective augmented training example 706, which can be combined with the training examples in the training data 614 to form the augmented training data 636, which can then be used by the model trainer 608 to train the models 610.

The model trainer 608 trains the model 610 by performing a hyperparameter tuning process that selects hyperparameters for configuring the model 610 and a training process that selects model parameters (e.g., weights and/or biases) for the model 610. Hyperparameters are settings that can be tuned or optimized to control the behavior of the model 610. Most models explicitly define hyperparameters that control different aspects of the models such as memory or cost of execution. However, additional hyperparameters may be defined to adapt a model to a specific scenario. For example, additional hyperparameters may be defined to determine rates for adaptively augmenting the training data, the num-

TABLE 3

| Templates | Regex Patterns | Replacement Patterns |
|---|---|---|
| {with, for, where, having} <date_attribute> {in, on} | {with, for, where, having} <NL of date_attribute> {in, on} | {in, on} |
| {month, year, day, week, quarter, hour} of <date_attribute> | {month, year, day, week, quarter, hour} of <NL of date_attribute> | {month, year, day, week, quarter, hour} |
| {by, for each, grouped by, per} <date_attribute> {month, year, day, week, quarter, hour} | {by, for each, grouped by, per} <NL of date_attribute> {month, year, day, week, quarter, hour} | {by, for each, grouped by, per} {month, year, day, week, quarter, hour} |
| {month, year, day, week, quarter, hour} <date_attribute> | {month, year, day, week, quarter, hour} <NL of date_attribute> | {month, year, day, week, quarter, hour} | ber of hidden units or layers of a model, the learning rate of a model, the convolution kernel width, and/or the number of parameters for a model.

The hyperparameter tuning process works by identifying N sets of hyperparameters (e.g., via a hyperparameter search technique such as grid search, Bayesian optimization, and the like) and configuring N instances of the model with the N sets of hyperparameters with each instance of the model being configured with a set of hyperparameters of the N sets of hyperparameters. The hyperparameter tuning process performs the hyperparameter tuning by generating logical form predictions for training examples in one or more test sets extracted from the training data 614 with each instance of the model 610 and evaluating performance of each instance of the model by comparing the logical form predictions generated by a respective instance to ground truth logical forms in the respective test set used to train the respective instance of the model (e.g., k-fold cross validation). The hyperparameter tuning process continues by determining the set of hyperparameters of the N sets of hyperparameters that resulted the best performing instance of the model of all the instances of the model (i.e., which model among the instances of the model predicted the labels of the training data for the respective instance with the greatest accuracy) and configuring the model with the determined set of hyperparameters. Accuracy of the model can be represented as a common numeric metric which can maximized or minimized according to the preferences of the user. Searching for a set of hyperparameters to maximize or minimize the metric can be tedious, thus search algorithms like grid search and random search may be used. Grid search picks out a grid of hyperparameter values and evaluates all of them. Guesswork is necessary to specify the min and max values for each hyperparameter. Random search randomly values a random sample of points on the grid. Smart hyperparameter tuning picks a few hyperparameter settings, evaluates the validation matrices, adjusts the hyperparameters, and re-evaluates the validation matrices. Examples of smart hyper-parameter are Spearmint (hyperparameter optimization using Gaussian processes) and Hyperopt (hyperparameter optimization using Tree-based estimators).

The training process works by performing iterative operations of inputting utterances from the augmented training data 636 into the model 610 to find a set of model parameters (e.g., weights and/or biases) that maximizes or minimizes an objective function (e.g., minimizes a loss function for the model 610). The objective function can be constructed to measure the difference between the logical forms inferred using the model 610 and the ground truth logical forms of the training examples of the training data 614. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various techniques may be used to learn this hypothesis function. In some techniques, as part of deriving the hypothesis function, the objective function may be defined that measures the difference between the ground truth value for input and the predicted value for that input. As part of training, techniques such as back propagation, random feedback, Direct Feedback Alignment (DFA), Indirect Feedback Alignment (IFA), Hebbian learning, Adam Optimization, and the like are used update the model parameters in such a manner as to minimize or maximize this objective function.

The model 610 is trained is once a set of model parameters are identified during the training. After the model 610 has been trained, the model trainer 608 validates the model 610 using the validation sets. The validation process includes iterative operations of inputting the validation sets into the trained model 610 using a validation technique such as K-Fold Cross-Validation, Leave-one-out Cross-Validation, Leave-one-group-out Cross-Validation, Nested Cross-Validation, or the like to obtain logical form outputs and comparing the logical form outputs to the ground truth logical forms of the training examples. The comparison can be performed using correlation techniques such as Bland-Altman method and the Spearman's rank correlation coefficients and calculating performance metrics such as the error, accuracy, precision, recall, receiver operating characteristic curve (ROC), etc. In some instances, the training and validating processes performed by the model trainer 608 can be repeatedly performed by the model trainer 608 until a predetermined condition is satisfied and a final set of model parameters is determined.

As should be understood, other training/validation mechanisms are contemplated and may be implemented within the model system 600. For example, the model 610 may be trained and model parameters may be tuned on datasets from a subset of obtained or filtered datasets and the datasets from a subset of obtained or filtered datasets may only be used for testing and evaluating performance of the model 610. Moreover, although the training mechanisms described herein focus on training a new model 610, these training mechanisms can also be utilized to fine tune existing models trained from other datasets. For example, in some instances, a model 610 might have been pre-trained using datasets from one or more different modalities or tasks. In those cases, the models 610 can be used for transfer learning and retrained/validated using the training and validating data as described above.

Once the models 610, including the NL2LF model 612, have been trained and validated, the training stage 602 can provide the models 610, including the NL2LF model 612, to the NL2LF translation stage 616, where it can be used in conjunction with the input information augmentation stage 620 to execute processes for translating a NL utterance included input information 618 and/or augmented input information 6220 to a LF 624. The processes can include collecting input information 618, augmenting input information 620 to generate augmented input information 622, providing the input information 618 and/or the augmented input information 622 to the NL2LF model 612, and, using the NL2LF model 612 to convert the NL utterance included in the input information 618 and/or the augmented input information 622 to the LF 624.

Figure 8A:
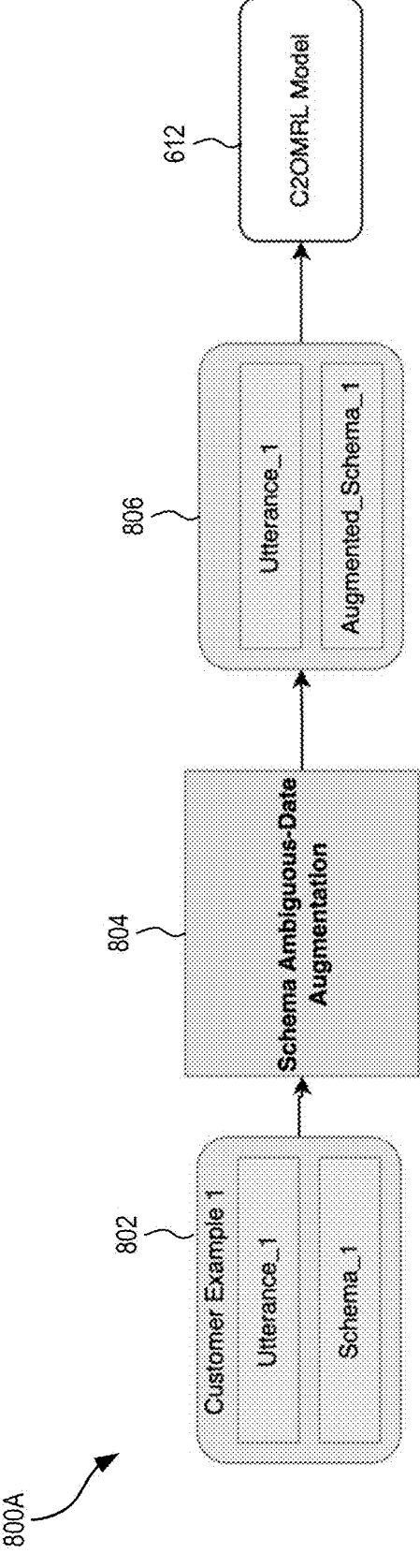
FIG. 8A is an example of a flow for preparing input information for a C2OMRL model in accordance with various embodiments.

The input information augmentation stage 620 collects the input information 618 and generates the augmented input information 622. The input information 618 can include an NL utterance and database schema information of a target database (e.g., a database to be searched). An example of a flow 800A for generating the augmented input information 622 is shown in FIG. 8A. As shown in FIG. 8A, the input information augmentation stage 620 generates the augmented input information 622 by collecting input information 802 (e.g., from a customer), performing augmentation 804 on the collected input information 802 to generate the augmented input information 806. As described above and as further shown in FIG. 8A, the augmented input information 806 can be used by the NL2LF model 612 (e.g., a C2OMRL model) to predict a LF for the NL utterance included in the augmented input information 806.

The input information augmentation stage 620 can selectively augment input information by augmenting input that has database schema information that includes certain date-type features. For example, in the event the database schema information of the input information does not have the certain date-type features, the input information augmentation stage 620 can provide the input information 618 to the NL2LF translation stage 616, and, in the event the database schema information of the input information 618 has the certain date-type features, the input information augmentation stage 620 can augment the input information 618 and provide the augmented input information 622 to the NL2LF translation stage 616. In some implementations, the input information augmentation stage 620 can augment input information 618 having database schema information that base schema information 814A of the input information 802. The Ambiguous-date Schema Augmentation component 804B can augment the database schema information 814A of the input information 802 to generate augmented schema information 814B by adding an additional attribute to the database schema information 814A. The additional attribute can be a date-type attribute and be uniquely identified in the augmented database schema information 814B as "unspecified_date_attribute". The additional attribute can serve as a date-type attribute which can be linked to ambiguous date mentions in input NL utterances. Examples of database schema information 814A and augmented database schema information 814B are shown in Table 4.

TABLE 4

Figure 8B:
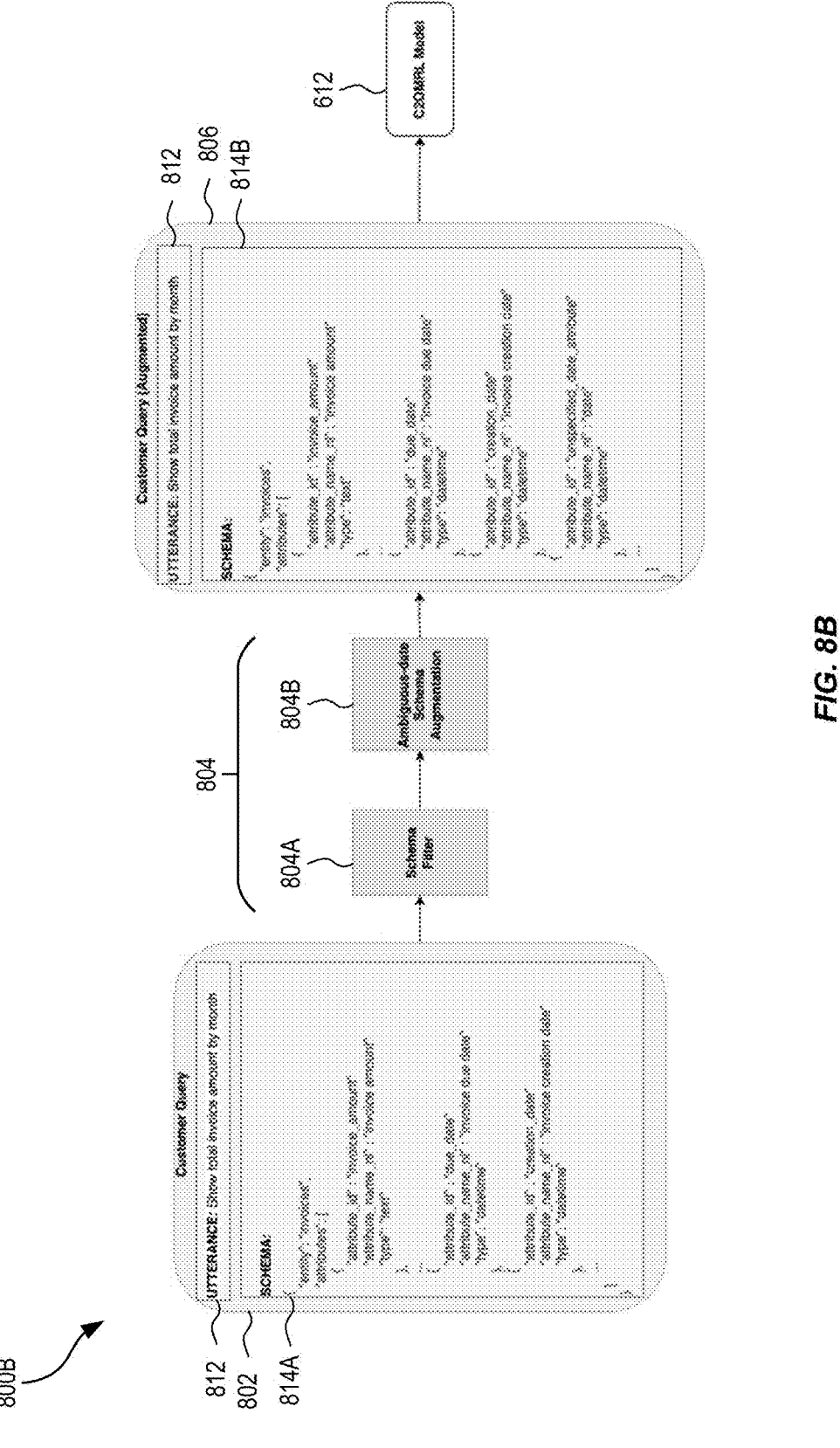
FIG. 8B is another example of a flow for preparing input information for a C2OMRL model in accordance with various embodiments.

| Database Schema Information | Augmented Database Schema Information |
|---|---|
| {<br>    "entity": "invoices",<br>    "attributes": [<br>        {<br>            "attribute_id" : "invoice_amount"<br>            "attribute_name_nl" : "invoice amount"<br>            "type": "text"<br>        },<br>        ...<br>        {<br>            "attribute_id" : "due_date"<br>            "attribute_name_nl" : "invoice due date"<br>            "type": "date"<br>        },<br>        {<br>            "attribute_id" : "creation_date"<br>            "attribute_name_nl" : "invoice creation date"<br>            "type": "date"<br>        },<br>        ...<br>    ]<br>} | {<br>    "entity": "invoices",<br>    "attributes": [<br>        {<br>            "attribute_id" : "invoice_amount"<br>            "attribute_name_nl" : "invoice amount"<br>            "type": "text"<br>        },<br>        ...<br>        {<br>            "attribute_id" : "due_date"<br>            "attribute_name_nl" : "invoice due date"<br>            "type": "date"<br>        },<br>        {<br>            "attribute_id" : "creation_date"<br>            "attribute name nl" : "invoice creation date"<br>            "type": "date"<br>        },<br>        {<br>            "attribute id" : "unspecified_date_attribute"<br>            "attribute_name_nl" : "date"<br>            "type": "date"<br>        },<br>        ...<br>    ]<br>} | includes more than one date-type attribute (i.e., two or more date-type attributes). For example, as shown in FIG. 8B, which shows another example of a flow 800B for generating the augmented input information 622, the input information 802 can be augmented because the database schema information of the input information 802 includes two date-type attributes, the date-type attributes "due_date" and "creation_date". In some implementations, as further shown in FIG. 8B, a schema filtering component 804A of the augmentation 804 can identify input information that includes database schema information having multiple date-type attributes such that input information 618 having certain date-type features can be augmented.

In the event the input information 802 is to be augmented, the input information augmentation stage 620 can augment the input information 802 by retaining the NL utterance 812 of the input information 802 and augmenting the database schema information 814A of the input information 802 to generate augmented database schema information 814B. In some implementations, as further shown in FIG. 8B, the augmentation 804 can include an Ambiguous-date Schema Augmentation component 804B for augmenting the data- In some implementations, at a high level, NL utterances and database schema information associated with those NL utterances are used as input to the NL2LF model 612 and the LF 624 (e.g., OMRL) is predicted based on cues from the NL utterances and the database schema information. The NL2LF model 612 extracts features and variables from the NL utterances and the database schema information to predict the one or more operators and format for the LF 624. In some implementations, the trained NL2LF model 612 predicts the one or more operator and format using one or more semantic parsing tasks.

To predict the LF 624 from the input information 618, an input string is generated by concatenating the NL utterance and the database schema information of the input information 618. To predict the LF 624 from the augmented input information 618, an input string is generated by concatenating the NL utterance and the augmented database schema information of the augmented input information 618.

Based on the input string, one or more embeddings of the NL utterance and the database schema information and/or augmented database schema information are generated by a first encoder. The input string is provided as input to the first encoder. In some instances, the first encoder is a Pre-trained Language Model (PLM), as described with respect to FIG. 5. The first encoder processes the input string to generate the one or more embeddings of NL utterance and the database schema information and/or augmented database schema information. This may be achieved using a single embedding or multiple embeddings. As described above, an embedding is a learned representation for text where words that have the same meaning have a similar representation and embeddings are generated by embedding techniques where individual words are represented as real-valued vectors in a predefined vector space so they can be understood by deep learning algorithms.

A second encoder encodes relations between elements in the database schema information and/or the augmented database schema information and words in the NL utterance, based on the generated one or more embeddings. As described above, the database schema information can include attributes including the date-type attributes and the additional date-type attributes (e.g., "unspecified_date_at-tribute"). The generated one or more embeddings are pro-vided from the first encoder to the second encoder. In some instances, the second encoder is a RAT as described with respect to FIG. 5. The second encoder includes multiple self-attention layers configured to apply self-attention to the one or more embeddings to identify relations between the entities in the database schema information and words in the natural language utterance.

In some instances, schema-linking relations that link elements in the database schema information and/or aug-mented database schema information and words in the NL utterance are also provided to the second encoder, and the embeddings are further generated based on the schema-linking relations. The schema-linking relations provide information to help the second encoder identify how the elements in the database schema information and/or aug-mented database schema information relate to the words in the NL utterance. Schema linking serves to capture latent linking between tokens in utterances and schema (e.g., entities/attributes in OMRL or tables/columns in SQL). The schema linking relations are encoded into layers of the second encoder as prior knowledge.

In some instances, name-based schema linking (NBSL) is applied. NBSL works to produce matching between tokens in the natural language utterance and elements in the data-base schema information and/or augmented database schema information. NBSL matches entities such as table names and column names to words in the input utterance, which can be based on an exact match or a partial match for both the primary name and its synonyms to elements in the database schema information.

In some instances, the OMRL schema includes rich metadata. This metadata includes information specifying synonyms for different words. For example, car is a syn-onym for automobile. Using this rich metadata in the OMRL schema, the NBSL can identify elements in the database schema information and/or augmented database schema information based on identifying synonyms as well as identifying an exact match. In other words, the schema-linking relations comprise metadata specifying synonyms for words. In some instances, the OMRL schema includes link attributes.

In some instances, content-based schema linking (CBSL) is applied. In CBSL for OMRL, data assets are preprocessed using preprocessing techniques. The preprocessing tech-niques combine named entity recognition and scalable searches (e.g., elastic search) to obtain CBSL matches between words or tokens of an NL utterance and system entities and/or values for attributes within a given database schema. The CBSL matches are appended to the utterance using a unique data structure, and then the data structure is input into the NL2LF model. The data structure facilitates encoding and decoding of the input NL utterance into a LF.

A grammar-based decoder generates a LF (e.g., an inter-mediate database query representation) based on the encoded relations and the one or more embeddings. As described above with respect to FIG. 5, the grammar-based decoder applies a bottom-up generative process using a beam search to generate an OMRL tree that represents the full OMRL LF. The grammar-based decoder obtains one or more raw beam scores generated from one or more beam levels of the grammar-based decoder. The one or more raw beam scores are used to classify the intermediate database query representation as correct or incorrect. In some instances, relational algebra (RA) grammar is further pro-vided to the grammar-based decoder. The RA grammar represents the logical form query as a tree. The RA grammar uses configured RA operators to represent the logical form query. The RA grammar is used to control the syntax of the decoder output to ensure that the generated logical form will have proper syntax, which will influence the processing steps later (including execution over existing databases). Thus, the LF is further based on the relational algebra grammar. In some instances, specialized RA grammar is adapted for OMRL.

Using the techniques described herein, in the case an input NL utterance includes an ambiguous date mention (e.g., a date that refers to more than one date-type attribute in the associated database schema), the NL2LF model 612 can encode and represent the ambiguous date mention in the LF 624. By encoding and representing the ambiguous date mention in the LF 624, the post-processing stage 626 can be aware of the ambiguous date mention. Examples of NL utterances including ambiguous date mentions and LF encoding the ambiguous date mentions is shown in Table 5.

TABLE 5

| Utterances | Logical Forms |
| --- | --- |
| How much is the profit for each month? | SELECT profit, ExtractMonth(unspecified_date_attribute) FROM orders GROUP BY ExtractMonth(unspecified_date_attribute) |
| How much is the profit for each product category in June 2022? | SELECT profit, product_category FROM orders WHERE unspecified_date_attribute = 'june 2022' GROUP BY product_category |

The LF 624 can then be post-processed at the post-processing stage 626 to generate a post-processed LF 628, where it can be used in a query execution stage 630. In some implementations, as described above, the LF 624 can include an attribute (e.g., unspecified_date_attribute) that represents an ambiguous date mention in the NL utterance of the input information 618. During post-processing, the post-processing stage 626 can identify any such attributes in the LF 624 and replace such attributes with a default date-type attribute from the database schema information of the input information 618 and/or add metadata to the LF 624 that can alert a downstream stage such as the query execution stage 630 that the NL utterance includes an ambiguity. Upon receiving such an alert, the downstream stage can trigger a disambiguation prompt that is presented on a user device and/or a request for additional information that can be presented on the user device.

Post-processing of the LF 624 to generate the post-processed LF 628 can also include translating the LF 624 to one or more desired system query languages, such as SQL or PGQL. The post-processed LF 628 represents the concepts that are present in the LF 624 in a manner that conforms to the requirements of the applicable system query language. The post-processed LF 628 can be provided to the query execution stage 630.

The query execution stage 630 includes one or more executors that are configured to execute the post-processed LF 628 on a system such as database 632 to obtain a result 634 (e.g., an answer to a query within NL utterances(s)). For example, the one or more executors may be configured to translate or convert the post-processed LF 628 to a systems language query or command such as SQL, APIs, REST, GraphQL, PGQL, etc., and execute the systems language query or command on a relational database such as database 632 to obtain the result 634 such as an answer to a query posed in the NL utterance(s). The result 634 can be provided to a user device.

While not explicitly shown, it will be appreciated that the system 600 may further include a developer device associated with a developer. Communications from a developer device to components of the system 600 may indicate what types of input data, utterances, and/or database schema are to be used for the models, a number and type of models to be used, hyperparameters of each model, for example, learning rate and number of hidden layers, how data requests are to be formatted, which training data is to be used (e.g., and how to gain access to the training data) and which validation technique is to be used, and/or how the controller processes are to be configured.

Illustrative Methods

FIG. 9A is a process flow 900A for training and providing a machine learning model for transforming a natural language utterance to a logical form. The processing depicted in FIG. 9A may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9A and described below is intended to be illustrative and non-limiting. Although FIG. 9A depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-6, the processing depicted in FIG. 9A may be performed by a system (e.g., system 600).

At block 902, training data is accessed. The training data can include a set of training examples. Each training example of the set of training examples can include a natural language utterance, a logical form corresponding to the natural language utterance, and database schema information. In some implementations, the database schema information includes a date-type attribute.

In some implementations, the training data can be obtained from one or more pre-existing datasets (e.g., Spider, SParC, CoSQL datasets and/or others) and/or accessed from one or more sources such as a database, a computing system, a customer or client, and the like. In some implementations, the training data can be obtained from and/or generated by humans (e.g., crowd-sourced human annotators). In other implementations, the training data can be automatically generated and/or retrieved from libraries. The natural language utterances of the training data can include text or input features associated with text such as tokens.

Database schema defines how data is organized within a database such as a relational database. A relational database can be formed of one or more tables with each table of the one or more tables including one or more columns with each column of the one or more columns of a respective table of the one or more tables including one or more values. Each column of the one or more columns of a respective table of the one or more tables represents an attribute of the respective table or database. Each table and column of a relational database can be associated with a unique identifier (e.g., an attribute ID), which can include one or more words (e.g., "ship_date"). In some instances, the unique identifier for a respective column of a respective table or the database can be indicative of an attribute represented by the respective column (e.g., the unique identifier "ship date" can indicate that the respective column represents a date-type attribute of the respective table or database). In some instances, the database schema information can include metadata that identifies a type and a natural language name for each column/attribute of the database (e.g., the "ship_date" attribute being a date type attribute with the natural language name "ship date"). For example, the metadata can identify columns corresponding to date-type attributes as date-type columns. In some instances, one or more columns of the relational database may serve as a primary key in which each of the values of the one or more columns that serve as the primary key are unique from each other. In some instances, one or more columns of the relational database may serve as a foreign key which serves to the link the table which includes the one or more columns with another table in the relational database. In some instances, the database schema information for a database includes one or more data structures for storing the unique identifiers of the one or more tables and/or the unique identifiers of the one or more columns. The unique identifiers can be stored by the training data preparer 604 in one or more vectors and/or matrices. In some implementations, a data structure storing schema information for a relational database can store a directed graph representing the unique identifiers and values.

At block 904, augmented training data is generated. The augmented training data can include a set of augmented training examples and the set of training examples. Each augmented training example of the set of augmented training examples can correspond to at least one training example of the set of training examples. In some implementations, generating each augmented training example of the set of augmented training examples includes modifying a particular natural language utterance of a particular training example of the set of training examples, modifying a particular logical form of the particular training example, and modifying particular database schema information of the particular training example. In some implementations, modifying the particular natural language utterance includes converting a date-type entity in the particular natural language utterance into a modified version of the date-type entity such that converting the date-type entity into the modified version of the date-type entity introduces a date-type ambiguity in the particular natural language utterance. In some implementations, the particular logical form comprises a first date-type attribute and modifying the particular logical form includes replacing the first date-type attribute with a second date-type attribute that corresponds to the additional date-type attribute. In some implementations, modifying the particular database schema information includes adding an additional date-type attribute to the particular database schema information. In some implementations, the particular training example is selected based on identifying training examples in the set of training examples that include: a date-type entity in the natural language utterance of a respective training example; a date-type attribute in the logical form of the respective training example; and a plurality of date-type attributes in the database schema information of the respective training example.

In some implementations, the natural language utterance of the respective selected training example can be modified to generate an augmented natural utterance by transforming the date mention or date mentions in the natural language utterance of the respective selected training example into an ambiguous date mention or ambiguous date mentions. The date mention or date mentions in the natural language utterance of the respective selected training example can be transformed into an ambiguous date mention or ambiguous date mentions by: (i) extracting the natural language name or natural language names of the date-type attribute or date-type attributes in the logical form of the respective selected training example from the database schema information of the respective selected training example; (ii) generating a set of regular expression (regex) patterns using the natural language name or natural language names and a set of templates; and (iii) transforming the date mention or date mentions of the natural language utterance to ambiguous date mention or date mentions by the applying the set of regex patterns to the date mention or date mentions of the natural language utterance.

The natural language name or natural language names of the date-type attribute or date-type attributes in the logical form of the respective selected training example can be extracted from the database schema information of the respective selected training example by identifying the date-type attribute or date-type attributes in the logical form and, for each respective date-type attribute, extracting the natural language name associated with the respective date-type attribute from the database schema information of the respective selected training example.

The set of regex patterns can be generated using the natural language name or natural language names and a set of templates by replacing date-type placeholder attributes of the set of templates with the natural language name or natural language names. Each respective template of the set of templates includes an attribute pattern that includes a particular arrangement of a date-type placeholder attribute and a set of words. In some implementations, an attribute pattern for a respective template includes: (i) the date-type placeholder attribute and a set of words that can precede the date-type placeholder attribute; (ii) the date-type placeholder attribute and a set of words that can follow the date-type placeholder attribute; or (iii) the date-type placeholder attribute and a set of words that can both precede and follow the date-type placeholder attribute.

Each regex pattern of the set of regex patterns can be generated from the set of templates by replacing the date-type placeholder attribute in each attribute pattern with the natural language name or natural language names of the date-type attribute or date-type attributes in the LF of the respective selected training example. As such, each respective regex pattern of the set of regex patterns includes a particular arrangement of a natural language name of a date-type placeholder attribute and a set of words. In some implementations, a word arrangement of a respective regex pattern includes: (i) the natural language name of the date-type placeholder attribute and a set of words that can precede the natural language name of the date-type placeholder attribute; (ii) the natural language date-type placeholder attribute and a set of words that can follow the natural language name of the date-type placeholder attribute; or (iii) the natural language name of the date-type placeholder attribute and a set of words that can both precede and follow the natural language name date-type placeholder attribute.

The sets of templates and regex patterns can be associated with a set of replacement patterns. Each respective replacement pattern of the set of replacement patterns can be associated with a respective template and the regex pattern generated from the respective template. Additionally, each replacement pattern can include a set of replacement words which can be used to replace words in the natural language utterance that are arranged in a pattern that matches a word pattern of one of the regex patterns of the set of regex patterns.

The date mention or date mentions of the natural language utterance of the respective selected training example can be transformed to an ambiguous date mention or ambiguous date mentions by: (i) identifying words in the natural language that are arranged in a pattern that matches a regex pattern of the set of regex patterns (i.e., the word arrangement of one of the regex patterns of the set of regex patterns matches an arrangement of a set of words in the NL utterances); (ii) selecting a word from the replacement pattern that is associated with the matching regex pattern; and (iii) replacing the identified words with the selected word.

In some implementations, the database schema information of a respective selected training example can be modified by adding an additional attribute to the database schema information. The additional attribute can be a date-type attribute and be uniquely identified in the augmented database schema information as "unspecified_date_attribute". The additional attribute can serve as a date-type attribute which can be linked to ambiguous date mentions in input natural language utterances.

The logical form of the respective selected training example can be modified by replacing the date-type attribute or date-type attributes of the LF with the additional attribute added to the database schema information.

In some implementations, each respective selected training example can be augmented to generate a respective augmented training example, which can be combined with the training examples in the training data to form the augmented training data, which can then be used to train a machine learning model.

At block 906, a machine learning model is trained with the augmented training data to generate a trained machine learning model. In some implementations, the machine learning model can be trained by performing a hyperparameter tuning process that selects hyperparameters for configuring the model and a training process that selects model parameters (e.g., weights and/or biases) for the model.

The hyperparameter tuning process works by identifying N sets of hyperparameters (e.g., via a hyperparameter search technique such as grid search, Bayesian optimization, and the like) and configuring N instances of the model with the N sets of hyperparameters with each instance of the model being configured with a set of hyperparameters of the N sets of hyperparameters. In some implementations, the hyperparameter tuning process performs the hyperparameter tuning by generating logical form predictions for training examples in one or more test sets extracted from the training data with each instance of the model and evaluating performance of each instance of the model by comparing the logical form predictions generated by a respective instance to ground truth logical forms in the respective test set used to train the respective instance of the model (e.g., k-fold cross validation). The hyperparameter tuning process continues by determining the set of hyperparameters of the N sets of hyperparameters that resulted the best performing instance of the model of all the instances of the model (i.e., which model among the instances of the model predicted the labels of the training data for the respective instance with the greatest accuracy) and configuring the model with the determined set of hyperparameters. Accuracy of the model can be represented as a common numeric metric which can maximized or minimized according to the preferences of the user. Searching for a set of hyperparameters to maximize or minimize the metric can be tedious, thus search algorithms like grid search and random search may be used. Grid search picks out a grid of hyperparameter values and evaluates all of them. Guesswork is necessary to specify the min and max values for each hyperparameter. Random search randomly values a random sample of points on the grid. Smart hyperparameter tuning picks a few hyperparameter settings, evaluates the validation matrices, adjusts the hyperparameters, and re-evaluates the validation matrices. Examples of smart hyper-parameter are Spearmint (hyperparameter optimization using Gaussian processes) and Hyperopt (hyperparameter optimization using Tree-based estimators).

In some implementations, the training process works by performing iterative operations of inputting utterances from the augmented training data into the model to find a set of model parameters (e.g., weights and/or biases) that maximizes or minimizes an objective function (e.g., minimizes a loss function for the model). The objective function can be constructed to measure the difference between the logical forms inferred using the model and the ground truth logical forms of the training examples of the training data. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, the objective function may be defined that measures the difference between the ground truth value for input and the predicted value for that input. As part of training, techniques such as back propagation, random feedback, Direct Feedback Alignment (DFA), Indirect Feedback Alignment (IFA), Hebbian learning, Adam Optimization, and the like are used update the model parameters in such a manner as to minimize or maximize this objective function.

At block 908, the trained machine learning model is provided. In some implementations, trained machine learning model is provided (e.g., deployed) to a query execution system, where it can be used to execute processes for converting a natural language utterance to logical form. The processes can include collecting input information, augmenting input information to generate augmented input information, providing the input information and/or the augmented input information to the trained machine learning model, and using the trained machine learning model to convert the natural language utterance included in the input information and/or augmented input information to the logical form.

FIG. 9B is a process flow 900B for using a machine learning model trained to transform a natural language utterance to a logical form to execute a query. The processing depicted in FIG. 9B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9B and described below is intended to be illustrative and non-limiting. Although FIG. 9B depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIGS. 1-6, the processing depicted in FIG. 9B may be performed by a system (e.g., system 600).

At block 910, input information is accessed. In some implementations, the input information is collected by the query execution system and accessed. The input information includes an input natural language utterance and input database schema information.

At block 912, it is determined whether the input database schema includes two or more date-type attributes. In the event the input database schema information does not include two or more date-type attributes, the flow can proceed to block 916 where the input information can be provided to the trained machine learning model. In the event the input database schema information includes two or more date-type attributes, the flow can proceed to block 914 where the input information is augmented.

At block 914, the input information is augmented to generate augmented input information. In some implementations, the augmented input information includes the input natural language utterance and a modified version of the input database schema information. In some implementations, the modified version of the input database schema information is generated by adding a new attribute that corresponds to an additional date-type attribute to the input database schema information.

In some implementations, the input information augmentation can be augmented by retaining the natural language utterance of the input information and augmenting the database schema information of the input information to generate augmented database schema information. The database schema information of the input information can be augmented by adding an additional attribute to the database schema information. The additional attribute can be a date-type attribute and be uniquely identified in the augmented database schema information as "unspecified_date_attribute". The additional attribute can serve as a date-type attribute which can be linked to ambiguous date mentions in input natural language utterances.

At block 916, the input information and/the augmented input information is provided to the trained machine learning model.

At block 918, the input natural language utterance is converted to an output logical form using the trained machine learning model based on the input natural language utterance and the modified version of the input database schema information. In some implementations, the output logical form for the input natural language utterance includes an operator and an attribute included in the modified version of the input database schema information.

In some implementations, at a high level, natural language utterances and database schema information associated with those natural language utterances are used as input to the trained machine learning model and the output logical form (e.g., OMRL) is predicted based on cues from the natural language utterances and the database schema information. The trained machine learning model extracts features and variables from the natural language utterances and the database schema information to predict the one or more operators and format for the output logical form. In some implementations, the trained machine learning model predicts the one or more operator and format using one or more semantic parsing tasks.

To predict the output logical form from the input information, an input string is generated by concatenating the natural language utterance and the database schema information of the input information. To predict the output logical form from the augmented input information, an input string is generated by concatenating the natural language utterance and the augmented database schema information of the augmented input information.

Based on the input string, one or more embeddings of the natural language utterance and the database schema information and/or augmented database schema information are generated by a first encoder. The input string is provided as input to the first encoder. In some instances, the first encoder is a Pre-trained Language Model (PLM), as described with respect to FIG. 5. The first encoder processes the input string to generate the one or more embeddings of NL utterance and the database schema information and/or augmented database schema information. This may be achieved using a single embedding or multiple embeddings. As described above, an embedding is a learned representation for text where words that have the same meaning have a similar representation and embeddings are generated by embedding techniques where individual words are represented as real-valued vectors in a predefined vector space so they can be understood by deep learning algorithms.

A second encoder encodes relations between elements in the database schema information and/or the augmented database schema information and words in the NL utterance, based on the generated one or more embeddings. As described above, the database schema information can include attributes including the date-type attributes and the additional date-type attributes (e.g., "unspecified_date_attribute"). The generated one or more embeddings are provided from the first encoder to the second encoder. In some instances, the second encoder is a RAT as described with respect to FIG. 5. The second encoder includes multiple self-attention layers configured to apply self-attention to the one or more embeddings to identify relations between entities in the database schema information and words in the natural language utterance.

In some instances, schema-linking relations that link elements in the database schema information and/or augmented database schema information and words in the NL utterance are also provided to the second encoder, and the embeddings are further generated based on the schema-linking relations. The schema-linking relations provide information to help the second encoder identify how the elements in the database schema information and/or augmented database schema information relate to the words in the NL utterance. Schema linking serves to capture latent linking between tokens in utterances and schema (e.g., entities/attributes in OMRL or tables/columns in SQL). The schema linking relations are encoded into layers of the second encoder as prior knowledge.

In some instances, name-based schema linking (NBSL) is applied. NBSL works to produce matching between tokens in the natural language utterance and elements in the database schema information and/or augmented database schema information. NBSL matches entities such as table names and column names to words in the input utterance, which can be based on an exact match or a partial match for both the primary name and its synonyms to elements in the database schema information.

In some instances, the OMRL schema includes rich metadata. This metadata includes information specifying synonyms for different words. For example, car is a synonym for automobile. Using this rich metadata in the OMRL schema, the NBSL can identify elements in the database schema information and/or augmented database schema information based on identifying synonyms as well as identifying an exact match. In other words, the schema-linking relations comprise metadata specifying synonyms for words. In some instances, the OMRL schema includes link attributes.

In some instances, content-based schema linking (CBSL) is applied. In CBSL for OMRL, data assets are preprocessed using preprocessing techniques. The preprocessing techniques combine named entity recognition and scalable searches (e.g., elastic search) to obtain CBSL matches between words or tokens of an NL utterance and system entities and/or values for attributes within a given database schema. The CBSL matches are appended to the utterance using a unique data structure, and then the data structure is input into the NL2LF model. The data structure facilitates encoding and decoding of the input NL utterance into a LF.

A grammar-based decoder generates an output logical form (e.g., an intermediate database query representation) based on the encoded relations and the one or more embeddings. As described above with respect to FIG. 5, the grammar-based decoder applies a bottom-up generative process using a beam search to generate an OMRL tree that represents the full OMRL LF. The grammar-based decoder obtains one or more raw beam scores generated from one or more beam levels of the grammar-based decoder. The one or more raw beam scores are used to classify the intermediate database query representation as correct or incorrect. In some instances, relational algebra (RA) grammar is further provided to the grammar-based decoder. The RA grammar represents the logical form query as a tree. The RA grammar uses configured RA operators to represent the logical form query. The RA grammar is used to control the syntax of the decoder output to ensure that the generated logical form will have proper syntax, which will influence the processing steps later (including execution over existing databases). Thus, the LF is further based on the relational algebra grammar. In some instances, specialized RA grammar is adapted for OMRL.

In this way, in the case an input natural language utterance includes an ambiguous date mention (e.g., a date that refers to more than one date-type attribute in the associated database schema), the trained machine learning model can encode and represent the ambiguous date mention in the output logical form. By encoding and representing the ambiguous date mention in the output logical form, other tasks such as post-processing can be aware of the ambiguous date mention in the natural language utterance.

At block 920, the output logical form is processed to generate a processed output logical form. In some implementations, generating the processed output logical form includes replacing an attribute included in the modified version of the input database schema information in the output logical form with another attribute included in the modified version of the input database schema information.

In some implementations, the output logical form can include an attribute (e.g., unspecified_date_attribute) that represents an ambiguous date mention in the natural language utterance of the input information. During processing, any such attributes in the output logical form can be identified and such attributes can be replaced with a default date-type attribute from the database schema information of the input information and/or metadata can be added to the output logical form such that a downstream stage can be alerted that the natural language utterance includes an ambiguity. Upon receiving such an alert, the downstream stage can trigger a disambiguation prompt that is presented on a user device and/or a request for additional information that can be presented on the user device.

At block 922, the processed output logical form is translated to a query language output statement. In some implementations, the query language output statement can be in one or more desired system query languages, such as SQL or PGQL.

At block 924, a query is executed using the query language output statement. In some implementations, the query is executed on a database associated with the input database schema information to retrieve a result for the query.

At block 926, the result for the query is provided to a user device. In some implementations, providing the result for the query to the user device includes incorporating the result for the query in a dialog between the user device and a skill bot and presenting the dialog on a display of the user device.

Illustrative Systems

Figure 10:
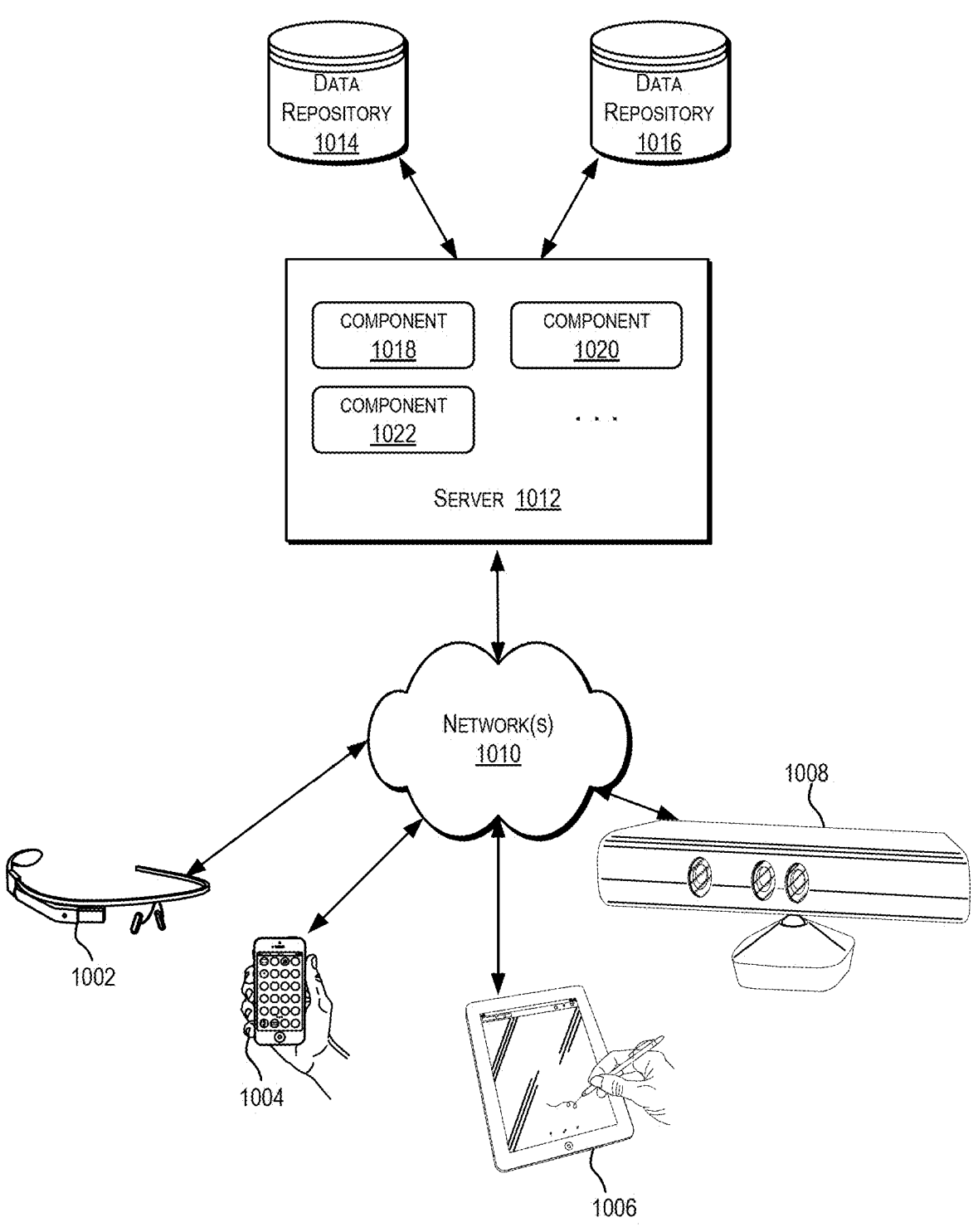
FIG. 10 depicts a simplified diagram of a distributed system for implementing various embodiments.

FIG. 10 depicts a simplified diagram of a distributed system 1000. In the illustrated example, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In various examples, server 1012 may be adapted to run one or more services or software applications that enable one or more embodiments described in this disclosure. In certain examples, server 1012 may also provide other services or software applications that may include non-virtual and virtual environments. In some examples, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The example shown in FIG. 10 is thus one example of a distributed system for implementing an example system and is not intended to be limiting.

Users may use client computing devices 1002, 1004, 1006, and/or 1008 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors, or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 may include one or more virtual machines running virtual operating systems, or other computing architectures involving virtualization such as one or more flexible pools of logical storage devices that may be virtualized to maintain virtual storage devices for the server. In various examples, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain examples. For example, one or more of the data repositories 1014, 1016 may be used to store information such as information related to chatbot performance or generated models for use by chatbots used by server 1012 when performing various functions in accordance with various embodiments. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain examples, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 1014, 1016 may also be used by applications to store application data. The data repositories used by applications may be of different types such as, for example, a key-value store repository, an object store repository, or a general storage repository supported by a file system.

Figure 11:
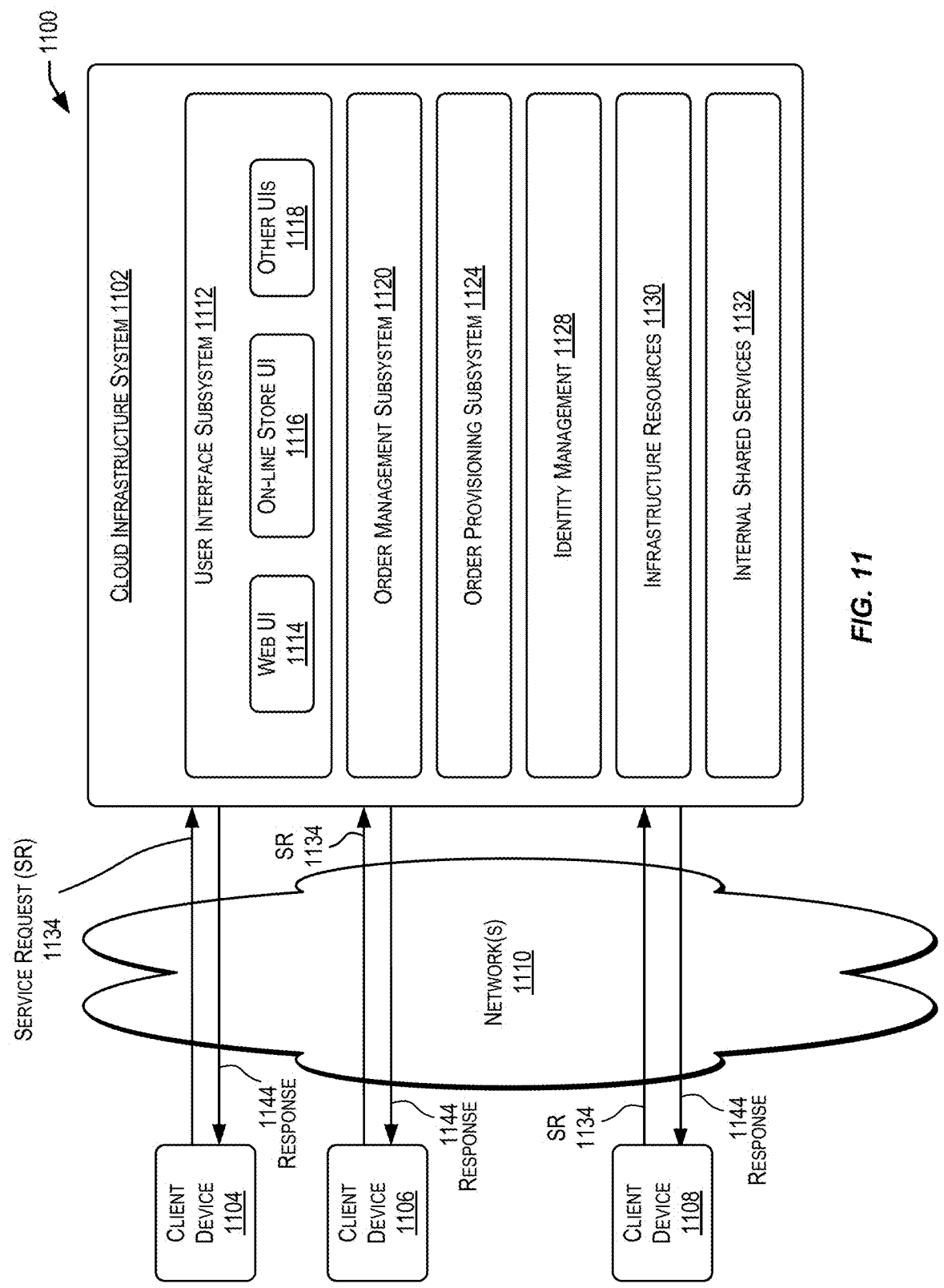
FIG. 11 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 11 is a simplified block diagram of a cloud-based system environment in which various services may be offered as cloud services in accordance with certain examples. In the example depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The example depicted in FIG. 11 is only one example of a cloud infrastructure system and is not intended to be limiting. It should be appreciated that, in some other examples, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative examples.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain examples, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1102. Cloud infrastructure system 1102 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third-party cloud services provider and the cloud services are offered to any general public customer, where the customer may be an individual or an enterprise. In certain other examples, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as client computing devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102. For example, a user may use a client device to request information or action from a chatbot as described in this disclosure.

In some examples, the processing performed by cloud infrastructure system 1102 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 1102 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like. In certain examples, the storage virtual machines that are available for servicing storage requested from applications may be part of cloud infrastructure system 1102. In other examples, the storage virtual machines may be part of different systems.

In certain examples, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for a service offered by cloud infrastructure system 1102. As part of the order, the customer may provide information identifying a chatbot system for which the service is to be provided and optionally one or more credentials for the chatbot system.

In certain examples, such as the example depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been preconfigured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 1102 as part of the provisioning process. Cloud infrastructure system 1102 may generate an application ID and select a storage virtual machine for an application from among storage virtual machines provided by cloud infrastructure system 1102 itself or from storage virtual machines provided by other systems other than cloud infrastructure system 1102.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 1102 and information identifying a chatbot system selected by cloud infrastructure system 1102 for the chatbot system corresponding to the chatbot system ID.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain examples, cloud infrastructure system 1102 comprises an identity management subsystem (IMS) 1128 that is configured to manage customer information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

Figure 12:
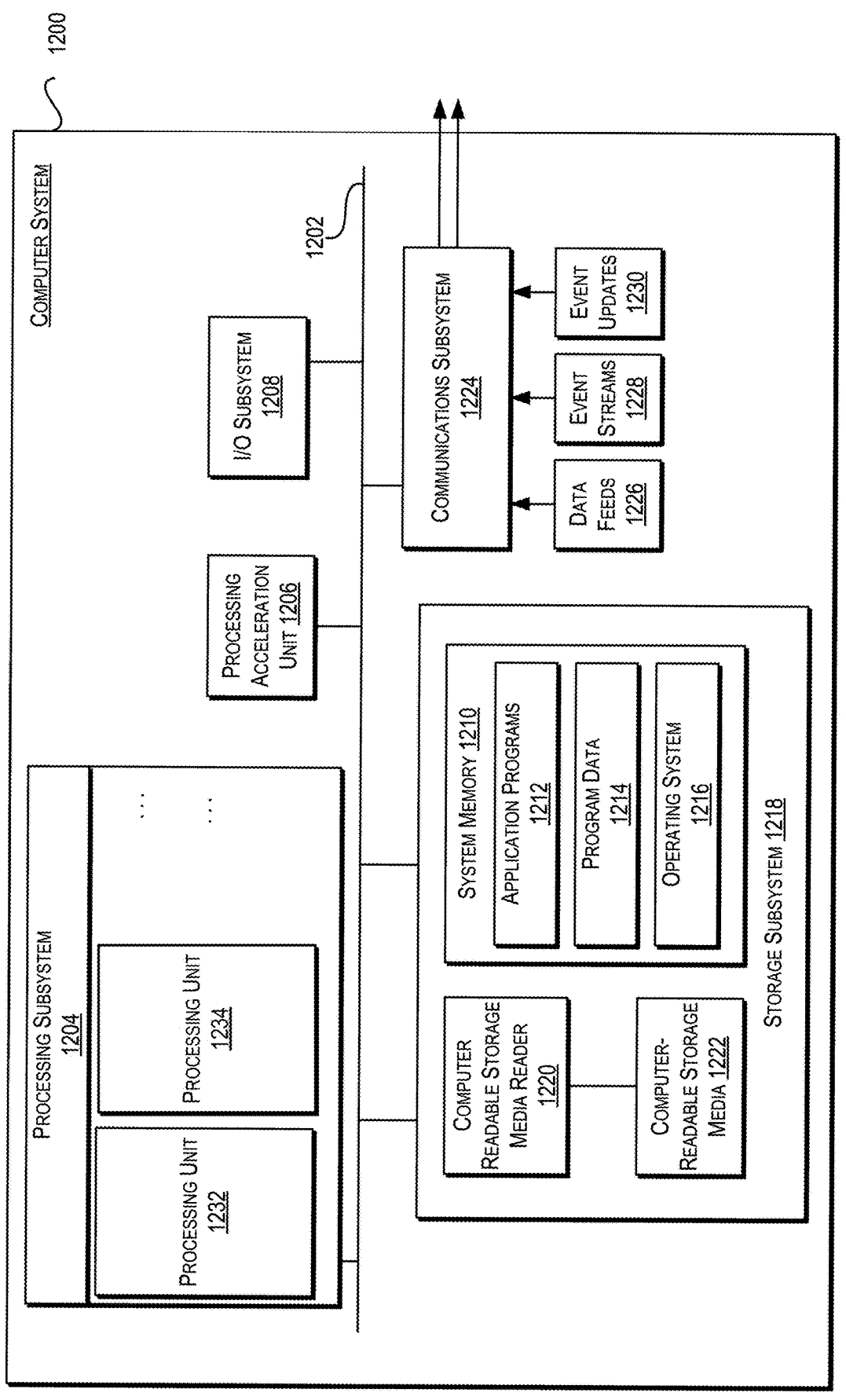
FIG. 12 illustrates an example computer system that may be used to implement various embodiments.

FIG. 12 illustrates an example of computer system 1200. In some examples, computer system 1200 may be used to implement any of the digital assistant or chatbot systems within a distributed environment, and various servers and computer systems described above. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative examples of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 may be organized into one or more processing units 1232, 1234, etc. A processing unit may include one or more processors, one or more cores from the same or different processors, a combination of cores and processors, or other combinations of cores and processors. In some examples, processing subsystem 1204 may include one or more special purpose co-processors such as graphics processors, digital signal processors (DSPs), or the like. In some examples, some or all of the processing units of processing subsystem 1204 may be implemented using customized circuits, such as application specific integrated circuits (ASICs), or field programmable gate arrays (FPGAs).

In some examples, the processing units in processing subsystem 1204 may execute instructions stored in system memory 1210 or on computer readable storage media 1222. In various examples, the processing units may execute a variety of programs or code instructions and may maintain multiple concurrently executing programs or processes. At any given time, some, or all of the program code to be executed may be resident in system memory 1210 and/or on computer-readable storage media 1222 including potentially on one or more storage devices. Through suitable programming, processing subsystem 1204 may provide various functionalities described above. In instances where computer system 1200 is executing one or more virtual machines, one or more processing units may be allocated to each virtual machine.

In certain examples, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics, and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some examples. Storage subsystem 12112 may store software (e.g., programs, code modules, instructions) that when executed by processing subsystem 1204 provides the functionality described above. The software may be executed by one or more processing units of processing subsystem 1204. Storage subsystem 1218 may also provide authentication in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh® and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some examples. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 1218 may also include a computer-readable storage media reader 1220 that may further be connected to computer-readable storage media 1222. Reader 1220 may receive and be configured to read data from a memory device such as a disk, a flash drive, etc.

In certain examples, computer system 1200 may support virtualization technologies, including but not limited to virtualization of processing and memory resources. For example, computer system 1200 may provide support for executing one or more virtual machines. In certain examples, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, when computer system 1200 is used to implement bot system 120 depicted in FIG. 1, the communication subsystem may be used to communicate with a chatbot system selected for an application.

Communication subsystem 1224 may support both wired and/or wireless communication protocols. In certain examples, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 1224 may provide wired network connectivity (e.g., Ethernet) in addition to or instead of a wireless interface.

Communication subsystem 1224 may receive and transmit data in various forms. In some examples, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), click-stream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A method comprising:
accessing training data comprising a set of training examples, wherein each training example of the set of training examples comprises a natural language utterance, a logical form corresponding to the natural language utterance, and database schema information, wherein the database schema information comprises a date-type attribute;
generating augmented training data comprising a set of augmented training examples and the set of training examples, wherein each augmented training example of the set of augmented training examples corresponds to at least one training example of the set of training examples, and generating each augmented training example of the set of augmented training examples comprises:
modifying a particular natural language utterance of a particular training example of the set of training examples,
modifying a particular logical form of the particular training example, and
modifying particular database schema information of the particular training example, wherein modifying the particular database schema information comprises adding an additional date-type attribute to the particular database schema information;
training a machine learning model with the augmented training data to generate a trained machine learning model; and
providing the trained machine learning model.

2. The method of claim 1, further comprising:
selecting the particular training example based on identifying training examples in the set of training examples that include:
a date mention in the natural language utterance of a respective training example;
a date-type attribute in the logical form of the respective training example; and
a plurality of date-type attributes in the database schema information of the respective training example.

3. The method of claim 1, wherein modifying the particular natural language utterance comprises converting a date mention in the particular natural language utterance into a modified version of the date mention, wherein the converting the date mention into the modified version of the date mention introduces an ambiguous date mention in the particular natural language utterance.

4. The method of claim 1, wherein the particular logical form comprises a first date-type attribute, and wherein modifying the particular logical form comprises replacing the first date-type attribute with a second date-type attribute that corresponds to the additional date-type attribute.

5. The method of claim 1, wherein the trained machine learning model is provided to a query execution system, and the method further comprising:
accessing input information collected by the query execution system, the input information comprising an input natural language utterance and input database schema information;
augmenting the input information to generate augmented input information, the augmented input information comprising the input natural language utterance and a modified version of the input database schema information, wherein the modified version of the input database schema information comprises a new attribute;
providing the augmented input information to the trained machine learning model; and
converting, using the trained machine learning model, the input natural language utterance to an output logical form based on the input natural language utterance and the modified version of the input database schema information, wherein the output logical form for the input natural language utterance comprises an operator and the new attribute.

6. The method of claim 5, wherein augmenting the input information comprises:
determining that the input database schema information includes two or more date-type attributes; and
generating the modified version of the input database schema information by adding a new attribute to the input database schema information, the new attribute corresponding to the additional date-type attribute.

7. The method of claim 5, wherein the input natural language utterance comprises an ambiguous date mention, and wherein converting the input natural language utterance to the output logical form comprises linking the ambiguous date mention to the new attribute.

8. The method of claim 5, further comprising:
processing the output logical form to generate a processed output logical form, wherein the processing output logical form to generating the processed output logical form comprises replacing an attribute included in the modified version of the input database schema information in the output logical form with another attribute included in the modified version of the input database schema information;
translating the processed output logical form to a query language output statement;
executing, using the query language output statement, a query on a database associated with the input database schema information to retrieve a result for the query; and
providing, by the query execution system, the result for the query to a user device.

9. A system comprising:
one or more processors; and
one or more computer-readable media storing instructions which, when executed by the one or more processors, cause the system to perform operations comprising:
accessing training data comprising a set of training examples, wherein each training example of the set of training examples comprises a natural language utterance, a logical form corresponding to the natural language utterance, and database schema information, wherein the database schema information comprises a date-type attribute;
generating augmented training data comprising a set of augmented training examples and the set of training examples, wherein each augmented training example of the set of augmented training examples corresponds to at least one training example of the set of training examples, and generating each augmented training example of the set of augmented training examples comprises:
modifying a particular natural language utterance of a particular training example of the set of training examples,
modifying a particular logical form of the particular training example, and
modifying particular database schema information of the particular training example, wherein modifying the particular database schema information comprises adding an additional date-type attribute to the particular database schema information;

training a machine learning model with the augmented training data to generate a trained machine learning model; and
providing the trained machine learning model.

10. The system of claim 9, the operations further comprising:
selecting the particular training example based on identifying training examples in the set of training examples that include:
a date mention in the natural language utterance of a respective training example;
a date-type attribute in the logical form of the respective training example; and
a plurality of date-type attributes in the database schema information of the respective training example.

11. The system of claim 9, wherein modifying the particular natural language utterance comprises converting a date mention in the particular natural language utterance into a modified version of the date mention, wherein the converting the date mention into the modified version of the date mention introduces an ambiguous date mention in the particular natural language utterance.

12. The system of claim 9, wherein the particular logical form comprises a first date-type attribute, and wherein modifying the particular logical form comprises replacing the first date-type attribute with a second date-type attribute that corresponds to the additional date-type attribute.

13. The system of claim 9, wherein the trained machine learning model is provided to a query execution system, and the operations further comprising:
accessing input information collected by the query execution system, the input information comprising an input natural language utterance and input database schema information;
augmenting the input information to generate augmented input information, the augmented input information comprising the input natural language utterance and a modified version of the input database schema information, wherein the modified version of the input database schema information comprises a new attribute;
providing the augmented input information to the trained machine learning model; and
converting, using the trained machine learning model, the input natural language utterance to an output logical form based on the input natural language utterance and the modified version of the input database schema information, wherein the output logical form for the input natural language utterance comprises an operator and the new attribute.

14. The system of claim 13, wherein augmenting the input information comprises:
determining that the input database schema information includes two or more date-type attributes; and
generating the modified version of the input database schema information by adding a new attribute to the input database schema information, the new attribute corresponding to the additional date-type attribute.

15. The system of claim 13, wherein the input natural language utterance comprises an ambiguous date mention, and wherein converting the input natural language utterance to the output logical form comprises linking the ambiguous date mention to the new attribute.

16. The system of claim 13, the operations further comprising:

processing the output logical form to generate a processed output logical form, wherein the processing output logical form to generating the processed output logical form comprises replacing an attribute included in the modified version of the input database schema information in the output logical form with another attribute included in the modified version of the input database schema information;

translating the processed output logical form to a query language output statement;

executing, using the query language output statement, a query on a database associated with the input database schema information to retrieve a result for the query; and providing, by the query execution system, the result for the query to a user device.

17. One or more non-transitory computer-readable media storing instructions which, when executed by one or more processors, cause a system to perform operations comprising:

accessing training data comprising a set of training examples, wherein each training example of the set of training examples comprises a natural language utterance, a logical form corresponding to the natural language utterance, and database schema information, wherein the database schema information comprises a date-type attribute;

generating augmented training data comprising a set of augmented training examples and the set of training examples, wherein each augmented training example of the set of augmented training examples corresponds to at least one training example of the set of training examples, and generating each augmented training example of the set of augmented training examples comprises:

modifying a particular natural language utterance of a particular training example of the set of training examples, modifying a particular logical form of the particular training example, and modifying particular database schema information of the particular training example, wherein modifying the particular database schema information comprises adding an additional date-type attribute to the particular database schema information;

training a machine learning model with the augmented training data to generate a trained machine learning model; and providing the trained machine learning model.

18. The one or more non-transitory computer-readable media of claim 17, the operations further comprising:

selecting the particular training example based on identifying training examples in the set of training examples that include:

a date mention in the natural language utterance of a respective training example;

a date-type attribute in the logical form of the respective training example; and a plurality of date-type attributes in the database schema information of the respective training example.

19. The one or more non-transitory computer-readable media of claim 17, wherein modifying the particular natural language utterance comprises converting a date mention in the particular natural language utterance into a modified version of the date mention, wherein the converting the date mention into the modified version of the date mention introduces an ambiguous date mention in the particular natural language utterance.

20. The one or more non-transitory computer-readable media of claim 17, wherein the particular logical form comprises a first date-type attribute, and wherein modifying the particular logical form comprises replacing the first date-type attribute with a second date-type attribute that corresponds to the additional date-type attribute.

* * * * *